(12) United States Patent
Rofougaran

(10) Patent No.: US 7,870,321 B2
(45) Date of Patent: Jan. 11, 2011

(54) EXTENDED COMPUTING UNIT WITH STAND-ALONE APPLICATION

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 119 days.

(21) Appl. No.: 12/326,971

(22) Filed: Dec. 3, 2008

(65) Prior Publication Data

US 2009/0198851 A1 Aug. 6, 2009

Related U.S. Application Data

(63) Continuation-in-part of application No. 12/026,681, filed on Feb. 6, 2008.

(51) Int. Cl.
*G06F 13/00* (2006.01)
(52) U.S. Cl. .......................................... 710/303; 713/2
(58) Field of Classification Search ......... 710/301–304; 713/1–2
See application file for complete search history.

(56) References Cited

U.S. PATENT DOCUMENTS

| | | | | |
|---|---|---|---|---|
| 5,579,489 A * | 11/1996 | Dornier et al. | ............... | 710/303 |
| 6,075,939 A * | 6/2000 | Bunnell et al. | ................ | 717/107 |
| 6,374,353 B1 * | 4/2002 | Settsu et al. | ..................... | 713/2 |
| 6,493,783 B1 * | 12/2002 | Kinoshita et al. | ........... | 710/303 |
| 6,571,308 B1 * | 5/2003 | Reiss et al. | ................. | 710/315 |
| 6,584,533 B1 * | 6/2003 | Cho et al. | .................... | 710/303 |
| 6,631,469 B1 * | 10/2003 | Silvester | ......................... | 713/2 |
| 6,735,663 B2 * | 5/2004 | Watts et al. | .................. | 710/313 |
| 6,842,795 B2 * | 1/2005 | Keller | .......................... | 710/15 |
| 7,010,634 B2 * | 3/2006 | Silvester | ..................... | 710/303 |
| 7,113,497 B2 * | 9/2006 | Cromer et al. | ............. | 370/338 |
| 7,149,837 B2 * | 12/2006 | Watts et al. | .................. | 710/303 |
| 7,197,584 B2 * | 3/2007 | Huber et al. | .................. | 710/72 |
| 7,222,207 B2 * | 5/2007 | Falcon | ......................... | 710/303 |
| 7,231,481 B2 * | 6/2007 | Scott et al. | ................... | 710/303 |
| 7,343,484 B2 * | 3/2008 | Du et al. | ......................... | 713/2 |
| 2003/0172218 A1 * | 9/2003 | Scott et al. | ................... | 710/303 |
| 2005/0050135 A1 * | 3/2005 | Hallermeier | ................ | 709/200 |
| 2005/0185364 A1 * | 8/2005 | Bell et al. | .................... | 361/679 |
| 2006/0010314 A1 * | 1/2006 | Xu | ................................... | 713/2 |
| 2007/0074226 A1 * | 3/2007 | Zimmer et al. | .............. | 719/321 |
| 2007/0180509 A1 * | 8/2007 | Swartz et al. | .................. | 726/9 |
| 2008/0028102 A1 * | 1/2008 | Peacock | ...................... | 709/248 |

* cited by examiner

*Primary Examiner*—Paul R Myers
(74) *Attorney, Agent, or Firm*—Garlick Harrison & Markison; Bruce E. Garlick

(57) ABSTRACT

An extended computing unit includes a connection module, memory, and hardware. The memory is operable to store one or more computer-level user applications, one or more exclusive extended computing unit user applications, an exclusive extended computing unit operating system, and an operating system extension of a computer-level operating system. When the connection module is not coupled to a handheld computing unit, the hardware is operable to execute the extended computing unit exclusive operating system, detect a request for activation of an extended computing unit exclusive user application of the one or more extended computing unit exclusive user applications, and execute a least a portion of the extended computing unit exclusive user application.

18 Claims, 20 Drawing Sheets

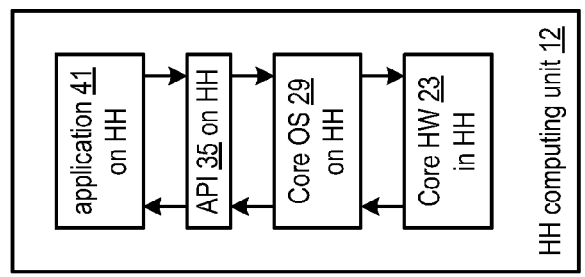
FIG. 6
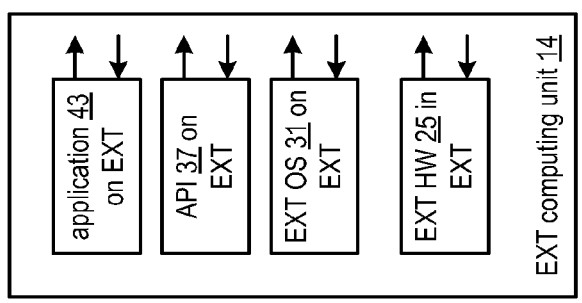
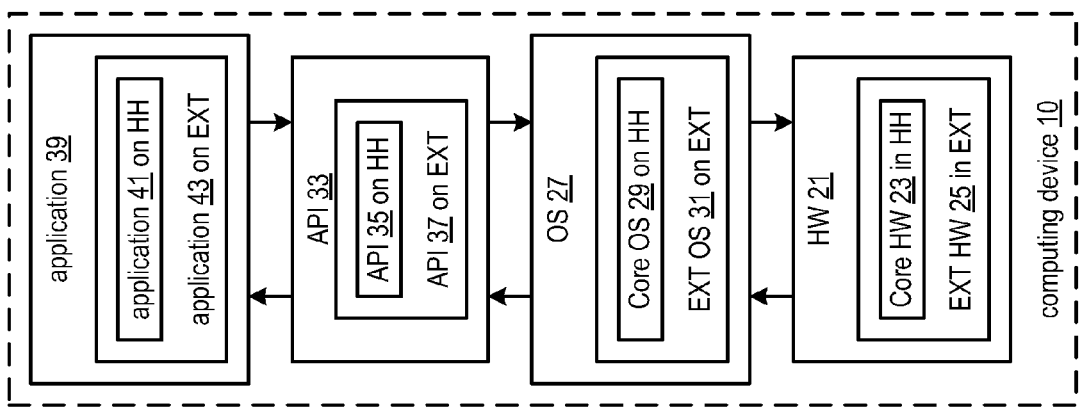
FIG. 5

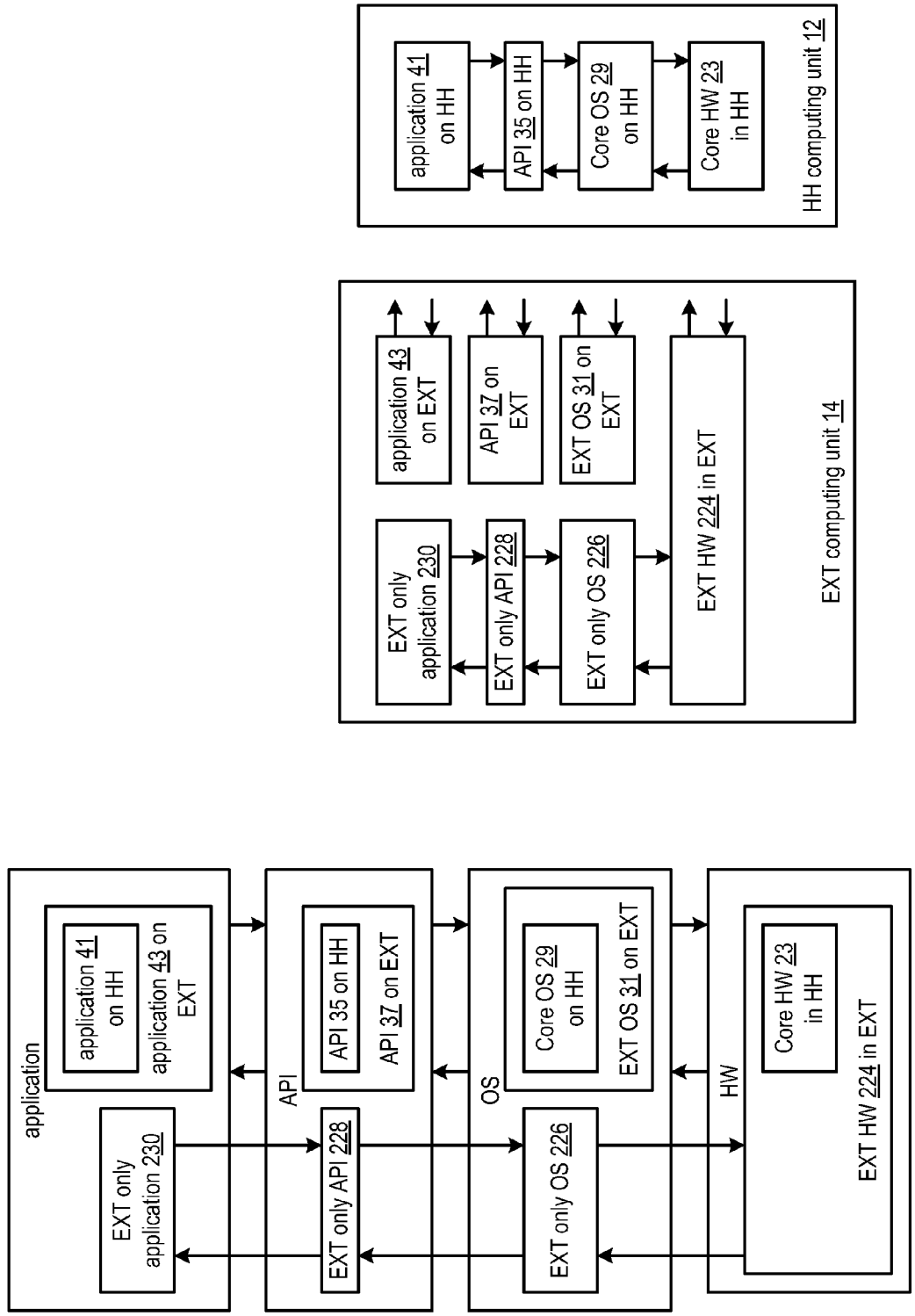

EXTENDED COMPUTING UNIT WITH STAND-ALONE APPLICATION

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008, and a Ser. No. 12/026,681.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

This invention relates generally to communication systems and more particularly to computing devices used in such communication systems.

DESCRIPTION OF RELATED ART

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. In general, the memory stores operating instructions that the processing core uses to generate data, which may also be stored in the memory. The peripheral devices allow a user of the communication device to direct the processing core as to which operating instructions to execute, to enter data, etc. and to see the resulting data. For example, a personal computer includes a keyboard, a mouse, and a display, which a user uses to cause the processing core to execute one or more of a plurality of applications.

While the various communication devices have a similar basic architecture, they each have their own processing core, memory, and peripheral devices and provide distinctly different functions. For example, a cellular telephone is designed to provide wireless voice and/or data communications in accordance with one or more wireless communication standards (e.g., IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof). As another example, a personal digital audio player is designed to decompress a stored digital audio file and render the decompressed digital audio file audible.

Over the past few years, integration of the some of the communication device functions into a single device has occurred. For example, many cellular telephones now offer personal digital audio playback functions, PDA functions, and/or GPS receiver functions. Typically, to load one or more of these functions, files, or other applications onto a handheld communication device (e.g., a cellular telephone, a personal digital audio and/or video player, a PDA, a GPS receiver), the handheld communication device needs to be coupled to a personal computer or laptop computer. In this instance, the desired application, function, and/or file is first loaded on to the computer and then copied to the handheld communication device; resulting in two copies of the application, function, and/or file.

To facilitate such loading of the application, function, and/or file in this manner, the handheld communication device and the computer each require hardware and corresponding software to transfer the application, function, and/or file from the computer to the handheld communication device. As such, two copies of the corresponding software exist as well as having two hardware components (one for the handheld device and the second for the computer). In addition to the redundancy of software, timing issues, different versions of the software, incompatible hardware, and a plethora of other reasons cause the transfer of the application, function, and/or file to fail.

In addition to integration of some functions into a single handheld device, handheld digital audio players may be docked into a speaker system to provide audible signals via the speakers as opposed to a headphone. Similarly, a laptop computer may be docked to provide connection to a full size keyboard, a separate monitor, a printer, and a mouse. In each of these docking systems, the core architecture is not changed.

While integration of functions into a single handheld device continues to evolve, there are some functions that are not mobile. For example, voice over internet protocol (VoIP) phone is typically a non-mobile function since it is used for a home phone and/or business phone. Other examples include utilization and/or control of cable TV, satellite TV, home entertainment equipment, etc.

Therefore, a need exists for a computing device that includes a handheld computing unit and an extended computing unit that at least partially allows for the extended computing unit to support one or more non-mobile functions.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a schematic block diagram of another embodiment of a computing device where a handheld computing unit is docked to an extended computing unit in accordance with the present invention;

FIG. 6 is a schematic block diagram of another embodiment of a computing device where a handheld computing unit is not docked to an extended computing unit in accordance with the present invention;

FIG. 20 is a schematic block diagram of another embodiment of a computing device where a handheld computing unit is docked to an extended computing unit in accordance with the present invention;

FIG. 21 is a schematic block diagram of another embodiment of a computing device where a handheld computing unit is not docked to an extended computing unit in accordance with the present invention;

DETAILED DESCRIPTION OF THE INVENTION

Figure 1:
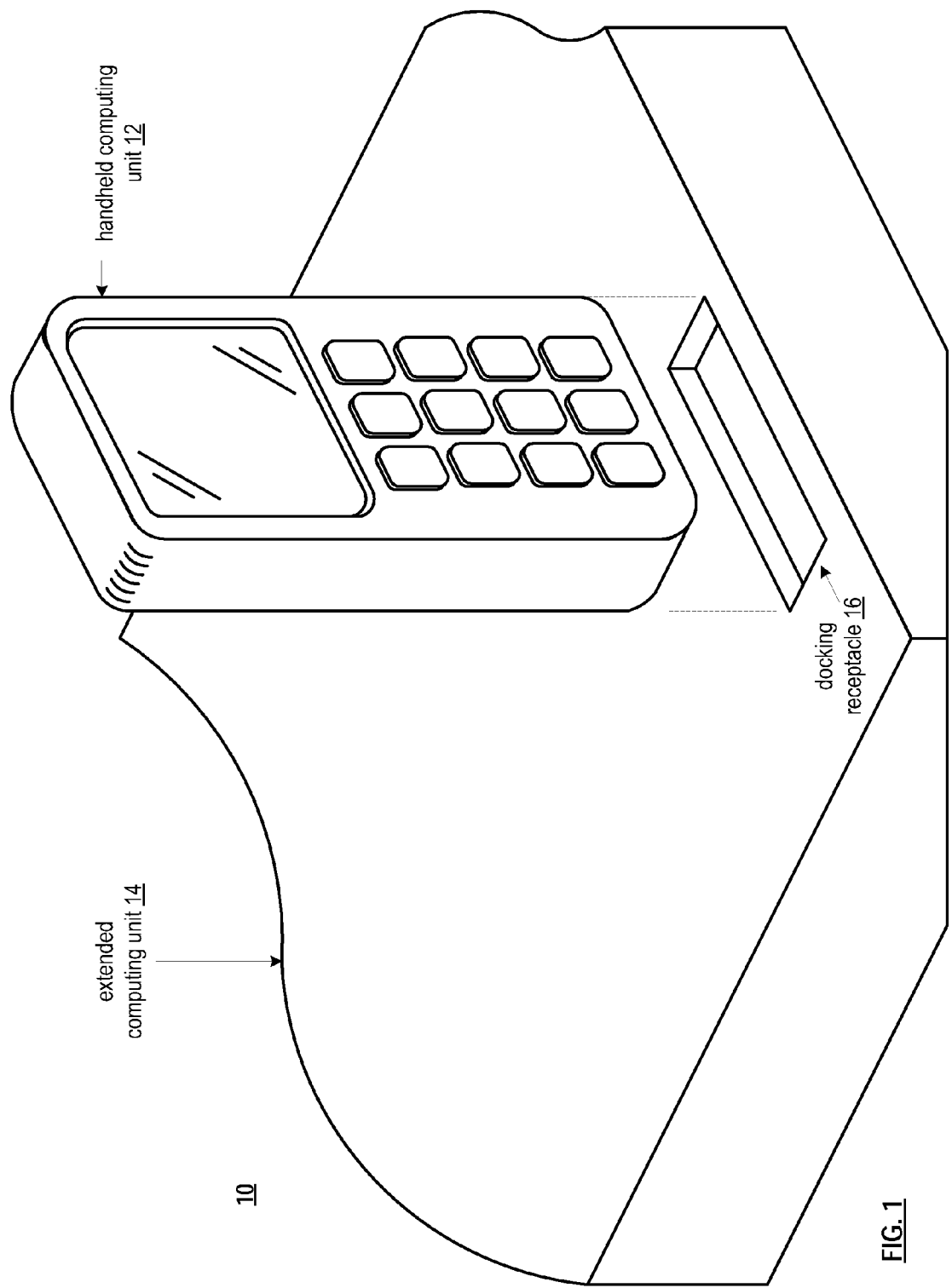
FIG. 1 is a diagram of an embodiment of a handheld computing unit and an extended computing unit in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
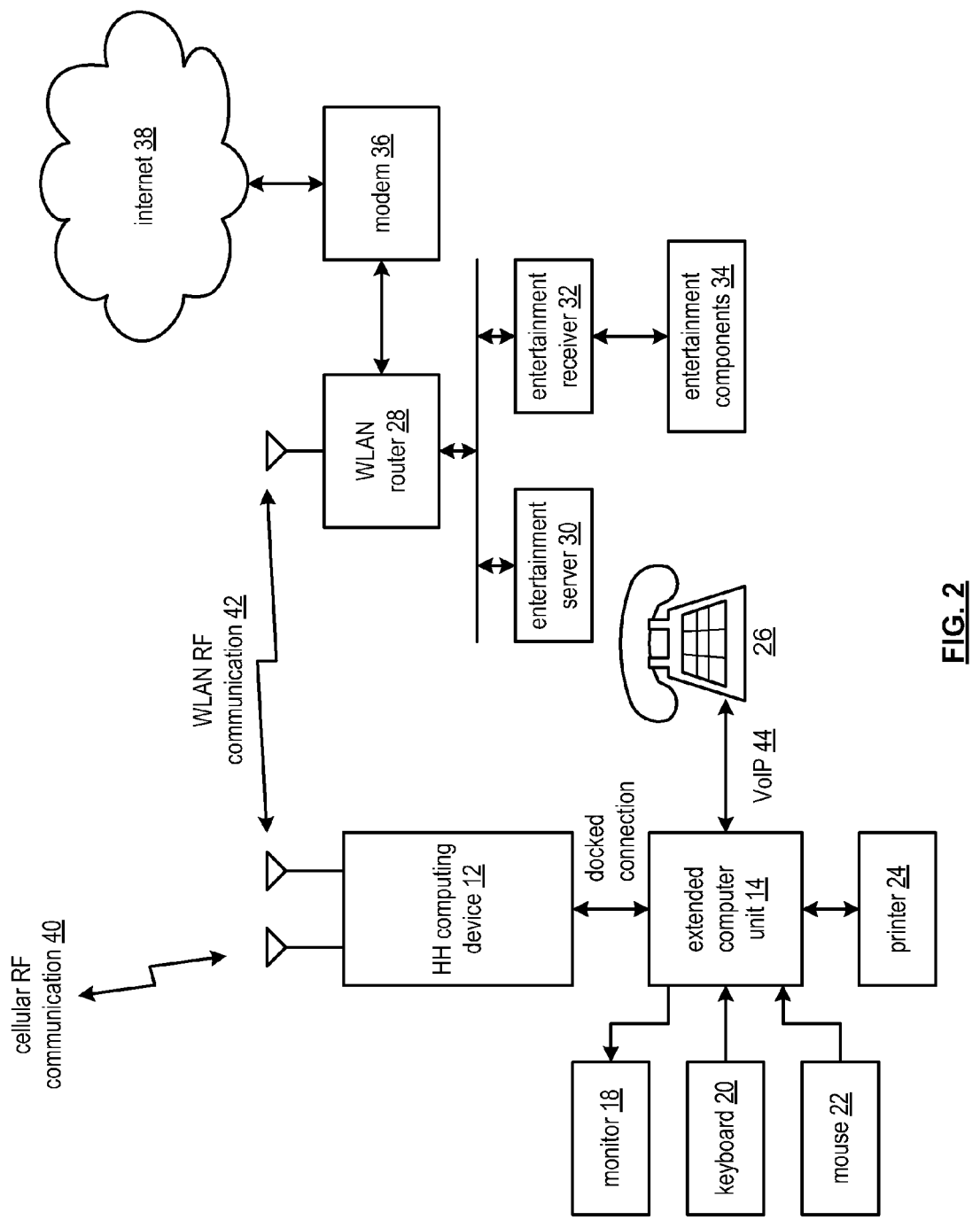
FIG. 2 is a schematic block diagram of an embodiment of a handheld computing unit docked to an extended computing unit within a communication system in accordance with the present invention.

FIG. 2 is a schematic block diagram of an embodiment of a handheld computing unit 12 docked to an extended computing unit 14 within a communication system. In this embodiment, the communication system may include one or more of a wireless local area network (WLAN) router 28, a modem 36 coupled to the internet 38, an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer. For example, for in-home or in-office use, having the extended computing unit with a form factor similar to a PC may be desirable. As another example, for traveling users, it may be more desirable to have a laptop form factor.

In this example, the handheld computing unit 12 is docked to the extended computer unit 14 and function together to provide the computing device 10. The docking of the handheld computing unit 12 to the extended computing unit 14 encompasses one or more high speed connections between the units 12 and 14. Such a high speed connection may be provided by an electrical connector, by an RF connector, by an electromagnetic connector, and/or a combination thereof. In this mode, the handheld computing unit 12 and the extended computing 14 collectively function similarly to a personal computer and/or laptop computer with a WLAN card and a cellular telephone card.

In this mode, the handheld computing unit 12 may transceive cellular RF communications 40 (e.g., voice and/or data communications). Outgoing voice signals may originate at the VoIP phone 26 as part of a VoIP communication 44 or a microphone coupled to the extended computing unit 14. The outgoing voice signals are converted into digital signals that are subsequently converted to outbound RF signals. Inbound RF signals are converted into incoming digital audio signals and that may be provided to a sound card within the extended computing unit for presentation on speakers or provided to the VoIP phone via as part of a VoIP communication 44.

Outgoing data signals may originate at the mouse 22, keyboard 20, image scanner, etc. coupled to the extended computing unit 14. The outgoing data signals are converted into digital signals that are subsequently converted to outbound RF signals. Inbound RF signals are converted into incoming data signals and that may be provided to the monitor 18, the printer 24, and/or other character presentation device.

In addition, the handheld computing unit 12 may provide a WLAN transceiver for coupling to the WLAN router 28 to support WLAN RF communications 42 for the computing device 10. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the computing device 10 (i.e., the handheld computing unit 12 and the extended computing unit 14) may use the WLAN communications 42 to retrieve and/or store music and/or video files on the entertainment server; and/or to access one or more of the entertainment components 34 and/or the entertainment receiver 32.

Figure 3:
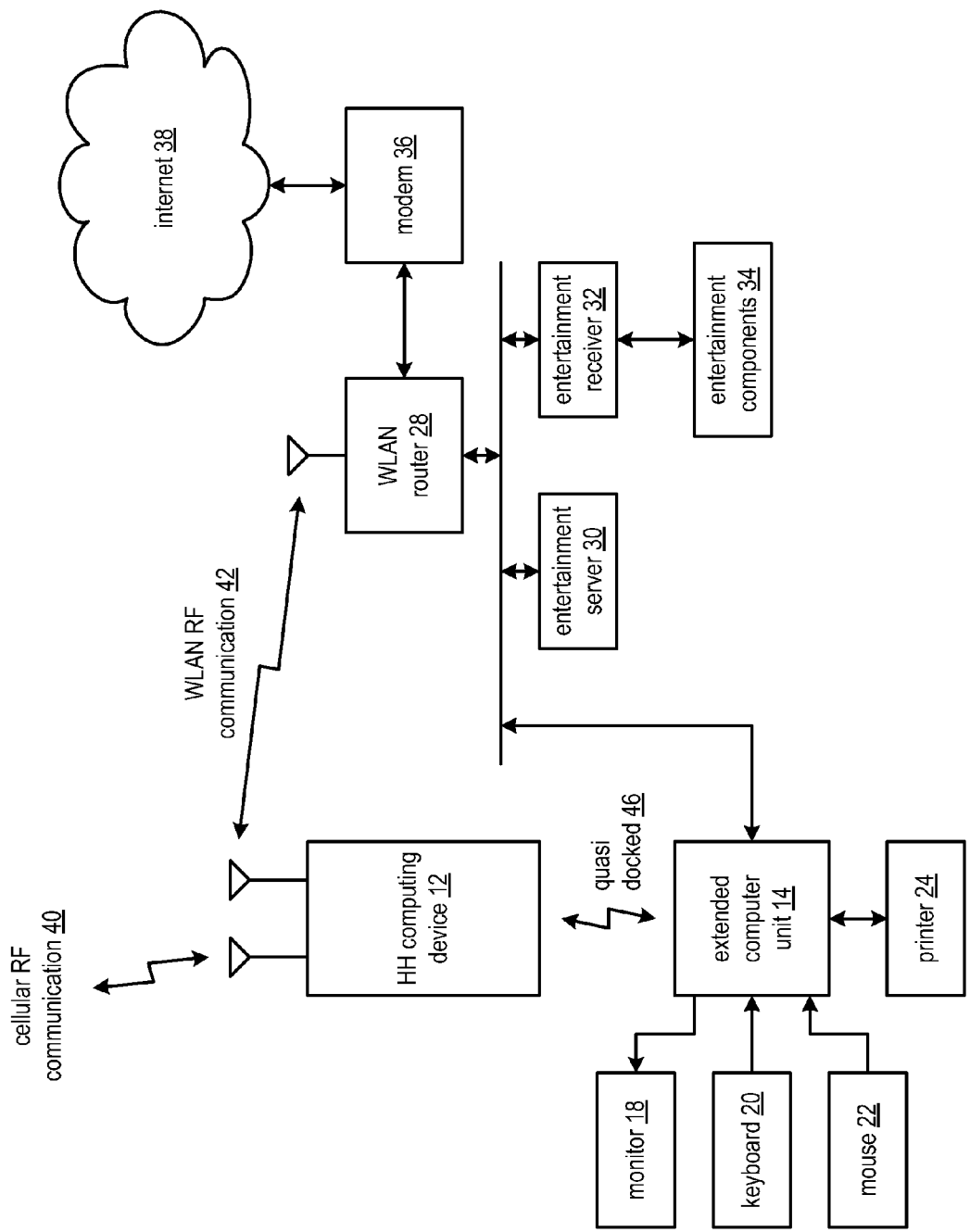
FIG. 3 is a schematic block diagram of an embodiment of a handheld computing unit quasi docked to an extended computing unit within a communication system in accordance with the present invention.

FIG. 3 is a schematic block diagram of an embodiment of a handheld computing unit 12 quasi docked to an extended computing unit 14 within a communication system. In this embodiment, the communication system may include one or more of a wireless local area network (WLAN) router 28, a modem 36 coupled to the internet 38, an entertainment server 30 (e.g., a server coupled to database of movies, music, video games, etc.), an entertainment receiver 32, entertainment components 34 (e.g., speaker system, television monitor and/or projector, DVD (digital video disc) player or newer versions thereof, VCR (video cassette recorder), satellite set top box, cable set top box, video game console, etc.), and a voice over internet protocol (VoIP) phone 26. As an alternative or in addition to the WLAN router 28, the system may include a local area network (LAN) router coupled to the extended computing unit 14.

As is also shown, the extended computing unit 14 is coupled to a monitor 18, a keyboard, a mouse 22, and a printer 24. The extended computing unit 14 may also be coupled to other devices (not shown) such as a trackball, touch screen, gaming devices (e.g., joystick, game pad, game controller, etc.), an image scanner, a webcam, a microphone, speakers, and/or a headset. In addition, the extended computing unit 14 may have a form factor similar to a personal computer and/or a laptop computer.

In this example, the handheld computing unit 12 is quasi docked 46 to the extended computer unit 14, where the handheld computing unit 12 functions as a stand-alone computer with limited resources (e.g., processing modules, user inputs/outputs, main memory, etc. of the handheld computing unit) and limited access to the memory of the extended computing unit 14. The quasi docking 46 of the handheld computing unit 12 to the extended computing unit 14 is provided by an RF communication, where an RF transceiver of the handheld computing unit 12 is communicating with an RF transceiver of the extended computing unit 14. Depending on the bit rate of the RF connection, the handheld computing unit can access files and/or applications stored in memory of the extended computing unit 14. In addition, the handheld computing unit 12 may direct the processing module of the extended computing unit 14 to perform a remote co-processing function, but the processing module of the handheld computing unit and the extended computing unit do not function as a multi-processing module as they do when in the docked mode.

As an alternative, the quasi docked mode may be achieved by the handheld computing unit 12 communicating with the extended computing unit via the WLAN communication 42 and the WLAN router 28. As yet another example, the quasi docked mode may be achieved via a data cellular RF communication 40 via the internet 38 to the extended computing unit 14.

In this mode, the handheld computing unit 12 may transceive cellular RF communications 40 (e.g., voice and/or data communications). Outgoing voice signals originate at a microphone of the handheld computing unit 12. The outgoing voice signals are converted into digital signals that are subsequently converted to outbound RF signals. Inbound RF signals are converted into incoming digital audio signals and that are provided to a speaker, or headphone jack, of the handheld computing unit 12.

Outgoing data signals originate at a keypad or touch screen of the handheld computing unit 12. The outgoing data signals are converted into digital signals that are subsequently converted to outbound RF signals. Inbound RF signals are converted into incoming data signals that are provided to the handheld display and/or other handheld character presentation device.

In addition, the handheld computing unit 12 may provide a WLAN transceiver for coupling to the WLAN router 28 to support WLAN RF communications 42 with the WLAN router 28. The WLAN communications 42 may be for accessing the internet 38 via modem 36, for accessing the entertainment server, and/or accessing the entertainment receiver 32. For example, the WLAN communications 42 may be used to support surfing the web, receiving emails, transmitting emails, accessing on-line accounts, accessing on-line games, accessing on-line user files (e.g., databases, backup files, etc.), downloading music files, downloading video files, downloading software, etc. As another example, the handheld computing unit 12 may use the WLAN communications 42 to retrieve and/or store music and/or video files on the entertainment server; and/or to access one or more of the entertainment components 34 and/or the entertainment receiver 32.

Figure 4:
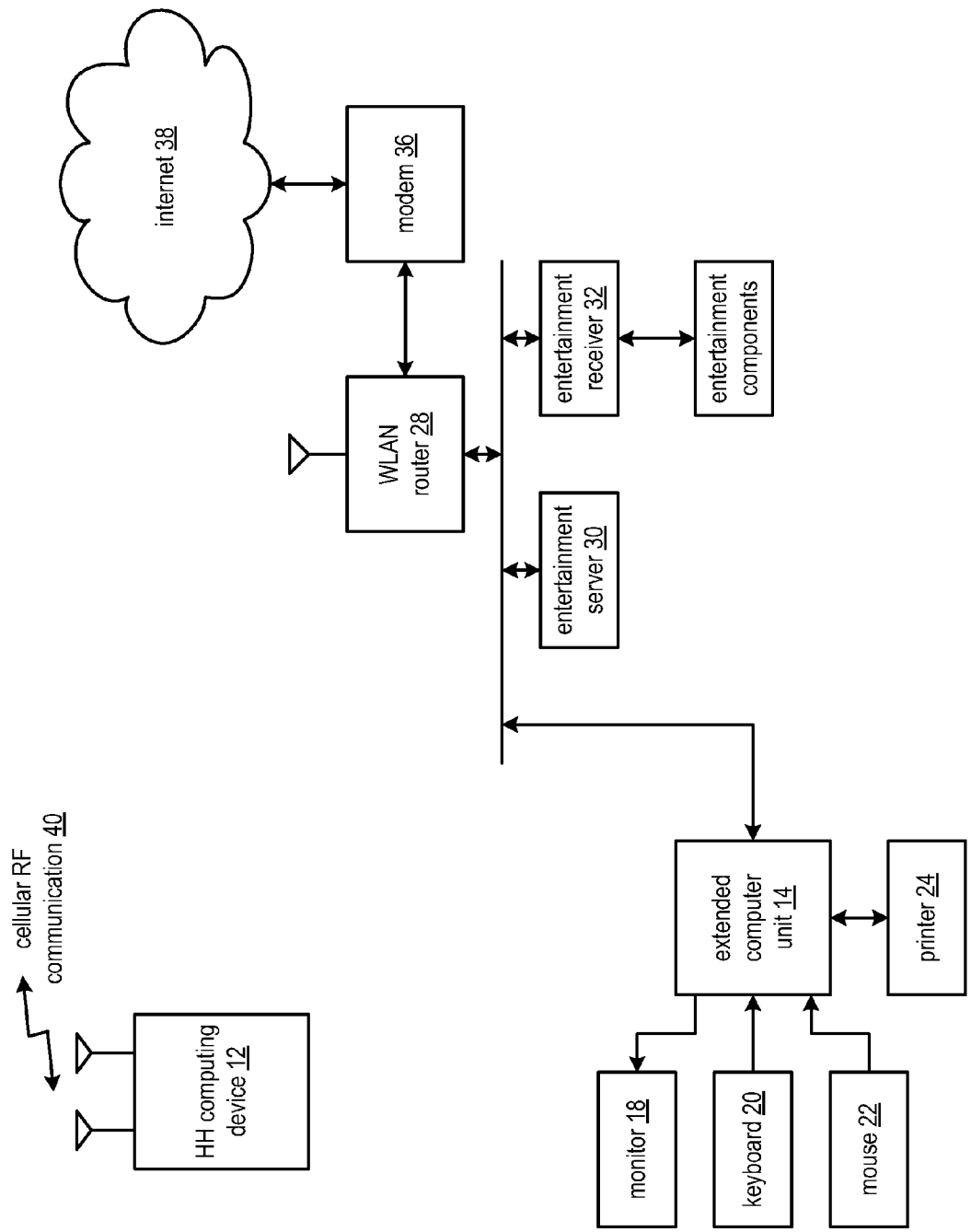
FIG. 4 is a schematic block diagram of an embodiment of a handheld computing unit in a remote mode with respect to an extended computing unit within a communication system in accordance with the present invention.

FIG. 4 is a schematic block diagram of an embodiment of a handheld computing unit 12 in a remote mode with respect to an extended computing unit 14. In this mode, the handheld computing unit 12 has no communications with the extended computing unit 14. As such, the extended computing unit 14 is disabled and the handheld computing unit 12 functions as a stand-alone computing device.

FIG. 5 is a schematic block diagram of another embodiment of a computing device 10 that includes a handheld computing unit 12 docked, or quasi-docked, with an extended computing unit 14. In this diagram, the computing device 10 includes computer level applications 39, computer level application programming interfaces (API) 33, a computer level operating system 27, and computer level hardware 21. The computer level applications 39 include system applications (e.g., input/output device drivers, peripheral device drivers, printer spoolers, video graphics, etc.) and user applications (e.g., database programs, word processing programs, spreadsheet programs, audio playback programs, video playback programs, etc.).

The hardware 21 portion of the computing device 10 includes core hardware 23 on the handheld (HH) computing unit 12 and hardware 25 of the EXT computing unit 14. As will be described in FIG. 7-17, the hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The hardware 25 of the EXT computing unit 14 may include one or more of: a hard disk and/or flash memory, main memory, a co-processing module, RAM, ROM, slave clock circuitry, an audio IO interface, a video IO interface, a data IO interface, and may further include a memory controller.

In this instance, the hardware of the HH computing unit 12 is the core hardware of the computing device 10 and the hardware of the EXT computing unit 14 provides an extension of the HH hardware 23. For example, the processing module of the HH computing unit 12 may use the processing module of the EXT computing unit 14 as a co-processor, as an auxiliary processor, as part of a multiple-processor core, or not use it at all. As another example, the HH computing unit 12 may use the main memory of the EXT computing unit 14 as an extension of its main memory, as an auxiliary main memory (e.g., use as a backup copy), as a second layer of cache (e.g., L1 or L2 cache), or not use it at all.

The operating system 27 includes a core operating system 29 stored in memory of the HH computing device 12 and an operating system extension 31 stored on the EXT computing unit 14. The operating system of the computing device 10 is discussed in detail with reference to FIGS. 20-36 of the parent application referenced above. In general, the core operating system 29 provides the primary operating system for the computing device 10 and the EXT operating system 31 augments the primary operating system for further functionality when the HH computing unit 12 is docked to the EXT computing unit 14.

The computer level API 33 includes APIs 35 that are stored on the HH computing unit 12 and APIs 37 that are stored on the EXT computing unit 14. Similarly, the computer level applications 39 include applications 41 that are stored on the HH computing unit 12 and applications 43 stored on the EXT computing unit 14. As described in the parent patent application, applications may reside on the handheld computing unit 12 (e.g., cellular telephone applications) or on the extended computing unit 14. The applications may be swapped therebetween such that, when the HH computing unit 12 is not docked to the EXT computing unit 14, the HH computing unit 12 can store the applications 39 of interest to the user of the HH computing device 12 in a mobile mode (i.e., not docked).

FIG. 6 is a schematic block diagram of another embodiment of a computing device 10 where the handheld computing unit 12 is not docked to an extended computing unit 14. In this instance, HH computing unit 12 functions as a stand-alone mobile device while the EXT computing unit 14 is substantially non-operational. As shown, the architecture of the HH computing unit 12 includes vertical functional coupling of the hardware 23, the operating system 29, the API 35, and the applications 41. As is also shown, the EXT computing unit 14 does not include vertical functional coupling since each of the blocks (e.g., hardware 25, operating system 31, API 37, and applications 43) are extensions of the corresponding blocks of the HH computing unit 12. In this manner, there is only one hardware core and one operating system for a computing device 10 that operates in a docked mode (e.g., FIG. 5) similarly to a personal computer and in a non-docked or mobile manner (e.g., FIG. 6) similarly to a cellular telephone with personal digital assistance capabilities, digital audio player capabilities, digital video player capabilities, handheld computing capabilities, and/or other mobile computing capabilities.

Figure 7:
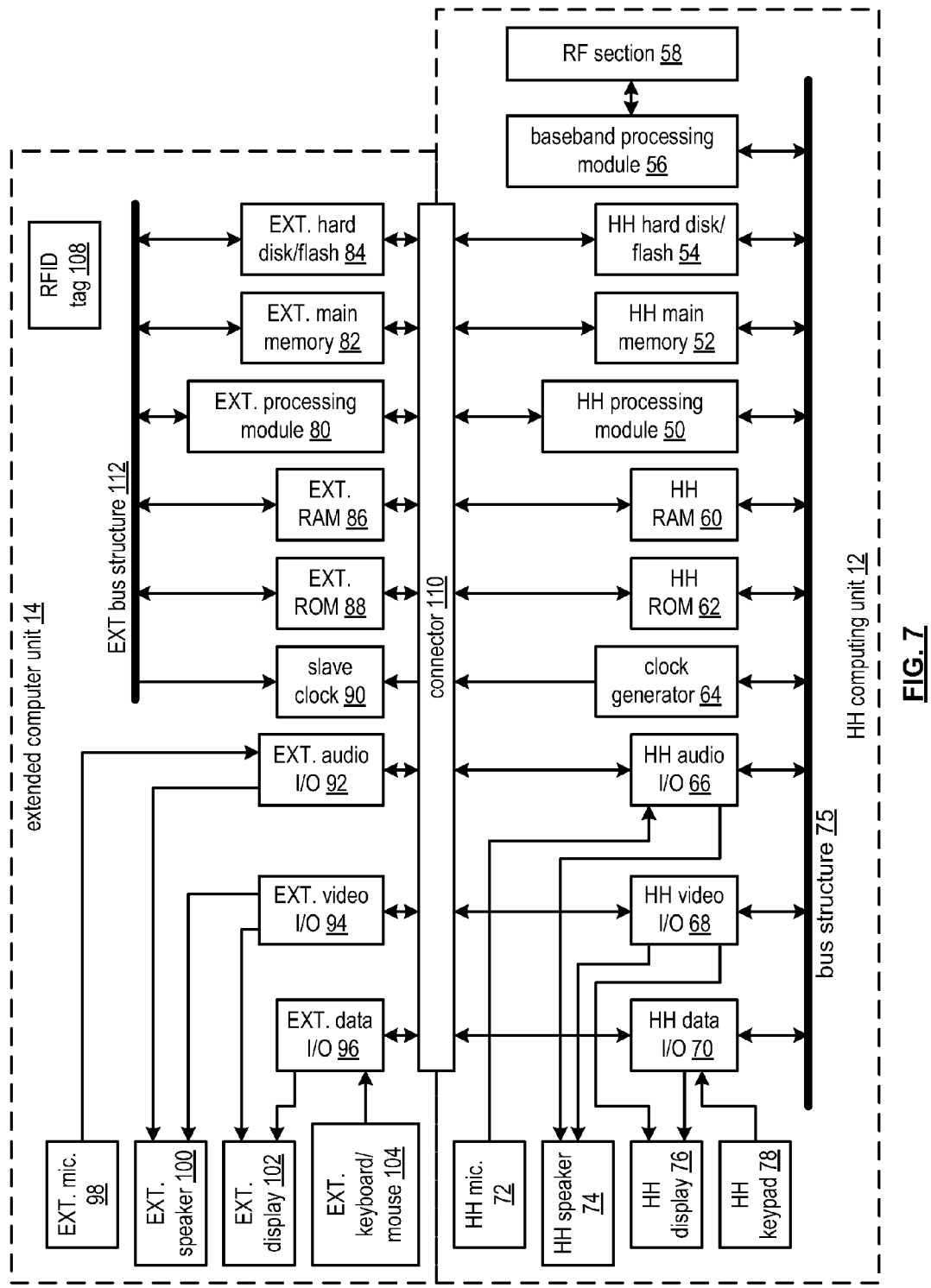
FIG. 7 is a schematic block diagram of an embodiment of a handheld computing unit docked to an extended computing unit in accordance with the present invention.

FIG. 7 is a schematic block diagram of an embodiment of a handheld computing unit 12 docked to an extended computing unit 14. The handheld computing unit 12 includes a handheld processing module 50, handheld main memory 52, handheld hard disk/flash memory 54, a baseband processing module 56, a radio frequency (RF) section 58, handheld random access memory (RAM) 60, handheld read only memory (ROM) 62, a clock generator circuit 64, handheld input/output (I/O) interfaces (e.g., handheld audio I/O interface 66, handheld video and/or graphics interface 68, and handheld data I/O interface 70), and handheld I/O components (e.g., handheld microphone 72, handheld speaker 74, handheld display 76, and a handheld keypad and/or touch screen 78), a handheld bus structure 75, and a handheld connection structure 110.

The extended computing unit 14 includes an extended processing module 80, extended main memory 82, extended hard disk/flash memory 84, extended random access memory (RAM) 86, extended read only memory (ROM) 88, a slave clock circuit 90, extended input/output (I/O) interfaces (e.g., extended audio I/O interface 92, extended video and/or graphics interface 94, and an extended data I/O interface 96), and extended I/O components (e.g., extended microphone 98, extended speaker 100, extended display 102—which may be monitor 18 and/or printer 24—, and an extended keyboard/mouse 104, which may be keyboard 20 and mouse 22), an extended connection structure 110, an extended bus structure 112, and a radio frequency identification (RFID) tag 108.

Within the handheld computing unit 12, the processing module 50 and the baseband processing module 56 may be separate processing modules or the same processing module. Such a processing module may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-24.

Also within the handheld computing unit 12, the handheld main memory 52 includes one or more RAM integrated circuits (IC) and/or boards. The RAM may be static RAM (SRAM) and/or dynamic RAM (DRAM). The handheld hard disk/flash memory 54 may be one or more of a hard disk, a floppy disk, an optical disk, NOR flash memory, NAND flash memory, and/or any other type of non-volatile memory. The clock generator circuit 64 may be one or more of: a phase locked loop, a crystal oscillator circuit, a fractional-N synthesizer, and/or a resonator circuit-amplifier circuit, where the resonator may be a quartz piezo-electric oscillator, a tank circuit, or a resistor-capacitor circuit. Regardless of the implementation of the clock generator circuit 64, it generates a master clock signal that is provided to the slave clock circuit 90 and generates the clock signals for the handheld computing unit 12. Such clock signals include, but are not limited to, a bus clock, a read/write clock, a processing module clock, a local oscillation, and an I/O clock.

The handheld ROM 62 stores the basic input/output system (BIOS) program for the computing device 10 (i.e., the handheld computing unit 12 and the extended computing unit 14). The ROM 62 may be one or more of an electronically erasable programmable ROM (EEPROM), a programmable ROM (PROM), and/or a flash ROM.

As used herein, an interface includes hardware and/or software for a device coupled thereto to access the bus of the handheld computing unit and/or of the extended computing unit. For example, the interface software may include a driver associated with the device and the hardware may include a signal conversion circuit, a level shifter, etc. Within the handheld computing unit, the handheld audio I/O interface 66 may include an audio codec, a volume control circuit, and/or a microphone bias and/or amplifier circuit to couple the handheld (HH) microphone 72 and/or the HH speaker 74 to the HH bus structure 75. The HH video I/O interface 68 may include a video codec, a graphics engine, a display driver, etc. to couple the HH display to the HH bus structure 75. The HH data I/O interface 70 may include the graphics engine, a display driver, a keypad driver, a touch screen driver, etc. to coupled the HH display 76 and/or the HH keypad 78 to the HH bus structure 75.

Within the extended computing unit 14, the extended (EXT) processing module 80 may be a single processing device or a plurality of processing devices, where a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-24.

Also within the extended computing unit 14, the EXT main memory 86 includes one or more RAM integrated circuits (IC) and/or boards. The RAM may be static RAM (SRAM) and/or dynamic RAM (DRAM). Note that the EXT main memory 86 and the EXT RAM 86 may be omitted if the handheld computing unit contains a sufficient amount of main memory. The EXT hard disk/flash memory 84 may be one or more of a hard disk, a floppy disk, at tape drive, an optical disk, NOR flash memory, NAND flash memory, and/or any other type of non-volatile memory. The slave clock circuit 90 may be a phase locked loop (PLL), clock divider, and/or clock multiplier that receives the master clock signal and produces therefrom the clock signals for the extended computing unit 14. Such clock signals include, but are not limited to, a bus clock, a read/write clock, a processing module clock, and an I/O clock.

The EXT ROM 88 may be one or more of an electronically erasable programmable ROM (EEPROM), a programmable ROM (PROM), and/or a flash ROM. Note that the EXT ROM 88 may be omitted if the HH ROM 62 is of sufficient size to accommodate the BIOS program and other system data that is stored in non-volatile memory.

The EXT audio I/O interface 92 may include a sound card and corresponding driver to couple the EXT microphone 98 and/or the EXT speaker 100 to the HH and/or EXT bus structure 75 and/or 112. The EXT video I/O interface 94 may include a video codec, a graphics card, a graphics control unit, a display driver, etc. to couple the EXT display 102 (e.g., monitor 18) to the HH and/or EXT bus structure 75 and/or 112. The EXT data I/O interface 98 may include the graphics card, the graphics control unit, a display driver, a keyboard and mouse driver(s), a touch screen driver, etc. to coupled the EXT display 104 and/or the EXT keyboard/mouse 104 to the HH and/or EXT bus structure 75 and/or 112.

The RFID tag 108 provides an RF communication link to the handheld computing unit 12 when the extended computing unit 14 is disabled. The RFID tag 108 may be implemented as disclosed in co-pending patent application entitled POWER GENERATING CIRCUIT, having a Ser. No. 11/394,808, and a filing date of Mar. 31, 2006.

When the computing device 10 is active in a wireless transmission, the baseband processing module 56 and the RF section 58 are active. For example, for cellular voice communications, the baseband processing module 56 converts an outbound voice signal into an outbound voice symbol stream in accordance with one or more existing wireless communication standards, new wireless communication standards, modifications thereof, and/or extensions thereof (e.g., GSM, AMPS, digital AMPS, CDMA, etc.). The baseband processing module 56 may perform one or more of scrambling, encoding, constellation mapping, modulation, frequency spreading, frequency hopping, beamforming, space-time-block encoding, space-frequency-block encoding, and/or digital baseband to IF conversion to convert the outbound voice signal into the outbound voice symbol stream. Depending on the desired formatting of the outbound voice symbol stream, the baseband processing module 56 may generate the outbound voice symbol stream as Cartesian coordinates (e.g., having an in-phase signal component and a quadrature signal component to represent a symbol), as Polar coordinates (e.g., having a phase component and an amplitude component to represent a symbol), or as hybrid coordinates as disclosed in co-pending patent application entitled HYBRID RADIO FREQUENCY TRANSMITTER, having a filing date of Mar. 24, 2006, and an application Ser. No. 11/388,822, and co-pending patent application entitled PROGRAMMABLE HYBRID TRANSMITTER, having a filing date of Jul. 26, 2006, and an application Ser. No. 11/494,682.

The RF section 58 converts the outbound voice symbol stream into an outbound RF voice signal in accordance with the one or more existing wireless communication standards, new wireless communication standards, modifications thereof, and/or extensions thereof (e.g., GSM, AMPS, digital AMPS, CDMA, etc.). In one embodiment, the RF section 58 receives the outbound voice symbol stream as Cartesian coordinates. In this embodiment, the RF section 58 mixes the in-phase components of the outbound voice symbol stream with an in-phase local oscillation to produce a first mixed signal and mixes the quadrature components of the outbound voice symbol stream to produce a second mixed signal. The RF section 58 combines the first and second mixed signals to produce an up-converted voice signal. The RF section 58 then amplifies the up-converted voice signal to produce the outbound RF voice signal, which it provides to an antenna section. Note that further power amplification may occur between the output of the RF section 58 and the input of the antenna section.

In other embodiments, the RF section 58 receives the outbound voice symbol stream as Polar or hybrid coordinates. In these embodiments, the RF section 58 modulates a local oscillator based on phase information of the outbound voice symbol stream to produce a phase modulated RF signal. The RF section 58 then amplifies the phase modulated RF signal in accordance with amplitude information of the outbound voice symbol stream to produce the outbound RF voice signal. Alternatively, the RF section 58 may amplify the phase modulated RF signal in accordance with a power level setting to produce the outbound RF voice signal.

For incoming voice signals, the RF section 58 receives an inbound RF voice signal via the antenna section. The RF section 58 converts the inbound RF voice signal into an inbound voice symbol stream. In an embodiment, the RF section 58 extracts Cartesian coordinates from the inbound RF voice signal to produce the inbound voice symbol stream. In another embodiment, the RF section 58 extracts Polar coordinates from the inbound RF voice signal to produce the inbound voice symbol stream. In yet another embodiment, the RF section 58 extracts hybrid coordinates from the inbound RF voice signal to produce the inbound voice symbol stream.

The baseband processing module 56 converts the inbound voice symbol stream into an inbound voice signal. The baseband processing module 56 may perform one or more of descrambling, decoding, constellation demapping, modulation, frequency spreading decoding, frequency hopping decoding, beamforming decoding, space-time-block decoding, space-frequency-block decoding, and/or IF to digital baseband conversion to convert the inbound voice symbol stream into the inbound voice signal, which is placed on the bus structure 75.

The baseband processing module 56 and the RF section function similarly for processing data communications and for processing WLAN communications. For data communications, the baseband processing module 56 and the RF section function in accordance with one or more cellular data protocols such as, but not limited to, Enhanced Data rates for GSM Evolution (EDGE), General Packet Radio Service (GPRS), high-speed downlink packet access (HSDPA), high-speed uplink packet access (HSUPA), newer version thereof, and/or replacements thereof. For WLAN communications, the baseband processing module 56 and the RF section 58 function in accordance with one or more wireless communication protocols such as, but not limited to, IEEE 802.11(a), (b), (g), (n), etc., Bluetooth, ZigBee, RFID, etc.

When the computing device 10 is executing one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.), the HH processing module 50 and the EXT processing module 80 function as a multiprocessing module and the HH and EXT main memories 52 and 82 function as combined main memory. In addition, the HH hard disk/flash memory 54 and the EXT hard disk/flash memory 84 function as a combined hard disk/flash memory.

For instance, the multiprocessing module provides multiprocessing via the HH and EXT processing modules 50 and 80. In this configuration, the processing modules 50 and 80 may share tasks and/or execute multiple concurrent software processes. Further, the processing modules 50 and 80 may be equal; one may be reserved for one or more special purposes; may be tightly coupled; may be loosely coupled; etc. For example, at the operating system level, the HH processing module 50 may be designated to respond to all interrupts, traps, and/or services calls and the invoke the EXT processing module 80 as needed. As another example, at the user level, the processing modules may function in a symmetrical multiprocessing mode, in an asymmetrical multiprocessing mode, in a non-uniform memory access multiprocessing mode, and/or in a clustered multiprocessing mode.

With respect to instruction and data streams, the processing modules 50 and 80 may execute a single sequence of instructions in multiple contexts (single-instruction, multiple-data or SIMD), multiple sequences of instructions in a single context (multiple-instruction, single-data or MISD), or multiple sequences of instructions in multiple contexts (multiple-instruction, multiple-data or MIMD).

The computing device 10 incorporates a virtual memory technique, overlays, and/or swapping to utilize the combined main memories and hard disk/flash memories for one or more user applications. In an embodiment, the virtual memory is divided the virtual address space into pages (e.g., a 4K-Byte block), where one or more page tables (e.g., one for the computing device, one for each running user application, etc.) translates the virtual address into a physical address. Note that the memory controller manages accesses to the one or more page tables to facilitate the fetching of data and/or instructions from physical memory. If a page table indicates that a page is not currently in memory, the memory controller and/or one of the processing modules 50 and/or 80 raise a page fault interrupt.

A paging supervisor of the operating system receives the page fault interrupt and, in response, searches for the desired page containing the required virtual address. Once found, the paging supervisor reads the page into main memory and updates the appropriate page table. If there is insufficient room the main memory, the paging supervisor saves an area of the main memory to the HH or EXT hard disk/flash memory and update the corresponding page table. The cleared area of main memory is then used for the new page.

With respect to user I/O devices, the HH microphone 72, the HH speaker 74, the HH display 76 and the HH keypad 78 may be disabled while the handheld computing unit is docked. In this mode, the EXT microphone 98, the EXT speaker 100, the EXT display 102, and the EXT keyboard/mouse 104 are active to provide the user interfaces to the computing device 10. Note that for a cellular voice telephone call, the inbound and outbound voice signals may be provided to/from the EXT microphone 98 and the speaker 100, an EXT headset (not shown), or the VoIP phone 46.

Figure 8:
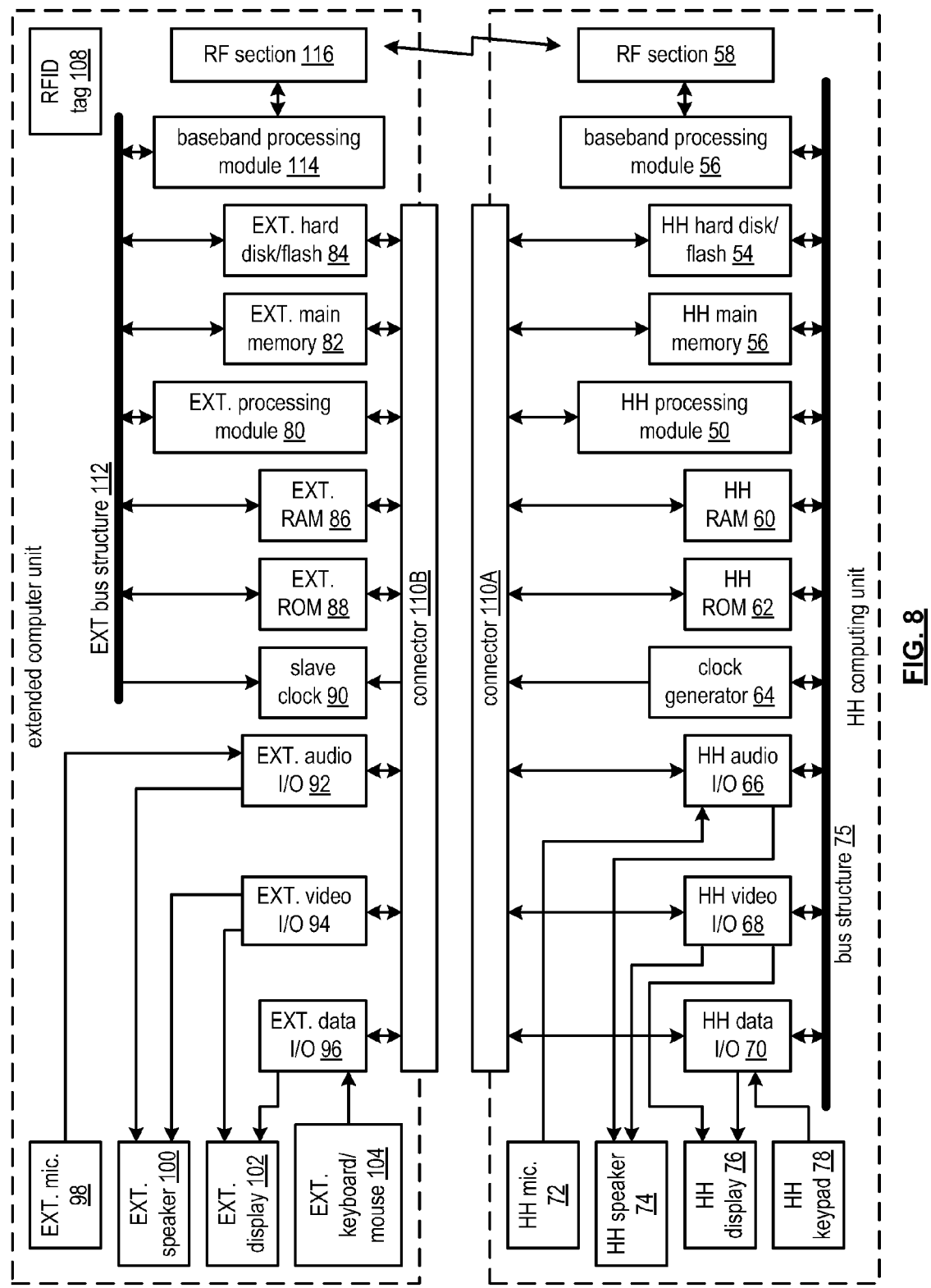
FIG. 8 is a schematic block diagram of an embodiment of a handheld computing unit quasi docked to an extended computing unit in accordance with the present invention.

FIG. 8 is a schematic block diagram of an embodiment of a handheld computing unit 12 quasi docked to an extended computing unit 14. The handheld computing unit 12 includes a handheld processing module 50, handheld main memory 52, handheld hard disk/flash memory 54, a baseband processing module 56, a radio frequency (RF) section 58, handheld random access memory (RAM) 60, handheld read only memory (ROM) 62, a clock generator circuit 64, handheld input/output (I/O) interfaces (e.g., handheld audio I/O interface 66, handheld video and/or graphics interface 68, and handheld data I/O interface 70), and handheld I/O components (e.g., handheld microphone 72, handheld speaker 74, handheld display 76, and a handheld keypad and/or touch screen 78), a handheld bus structure 75, and a handheld connection structure 110A.

The extended computing unit 14 includes an extended processing module 80, extended main memory 82, extended hard disk/flash memory 84, extended random access memory (RAM) 86, extended read only memory (ROM) 88, a slave clock circuit 90, extended input/output (I/O) interfaces (e.g., extended audio I/O interface 92, extended video and/or graphics interface 94, and an extended data I/O interface 96), and extended I/O components (e.g., extended microphone 98, extended speaker 100, extended display 102—which may be monitor 18 and/or printer 24—, and an extended keyboard/mouse 104, which may be keyboard 20 and mouse 22), an extended connection structure 110B, an extended bus structure 112, an RFID tag 108, a baseband processing module 114, and an RF section 116. Note that the EXT processing module 80 and the baseband processing module 114 may be separate processing modules or the same processing module.

In the quasi docked mode, the baseband processing module 114 and the RF section 58 for the extended computing unit 14 establish an RF communication path 46 with the RF section 58 and the baseband processing module 56 of the handheld computing unit 12. In this mode, the RF communication path 46 is essentially functioning as a wireless bus coupling the HH bus structure 75 to the EXT bus structure 112 such that the handheld computing unit 12 may access the EXT main memory 82 and/or the EXT hard disk/flash memory of the extended computing unit 14. The baseband processing modules 56 and 114 and the RF sections 58 and 116 may utilize a wireless communication protocol such as, but not limited to, IEEE 802.11(a), (b), (g), (n), etc., Bluetooth, ZigBee, RFID, etc.

With the computing device 10 in a quasi docked mode, the HH processing module 50 executes one or more user applications (e.g., word processing, spreadsheet processing, presentation processing, email, web browsing, database, calendar, video games, digital audio playback, digital video playback, digital audio record, digital video record, video games, contact management program, notes, web favorites, money management program, etc.) using the HH main memory 52. In this mode, the EXT processing module 80 and the EXT main memory are inactive except to facilitate read/write functions to the EXT hard disk/flash memory 84, which is treated as a lower level memory than the HH hard disk/flash memory 54.

In this mode, the virtual memory technique utilizes the HH main memory 52 and the HH hard disk/flash memory 54 for one or more user applications. Further memory management includes copying user applications and/or files from the EXT hard disk/flash memory 84 to the HH hard disk/flash memory 54 before it can be included in virtual memory and hence accessed by the HH processing module 50. Note that if the HH hard disk/flash memory 54 does not have sufficient space to store the user applications and/or files, the one or more user applications and/or files are transferred from the HH hard disk/flash memory 54 to the EXT hard disk/flash memory 84 to free up memory space.

Figure 9:
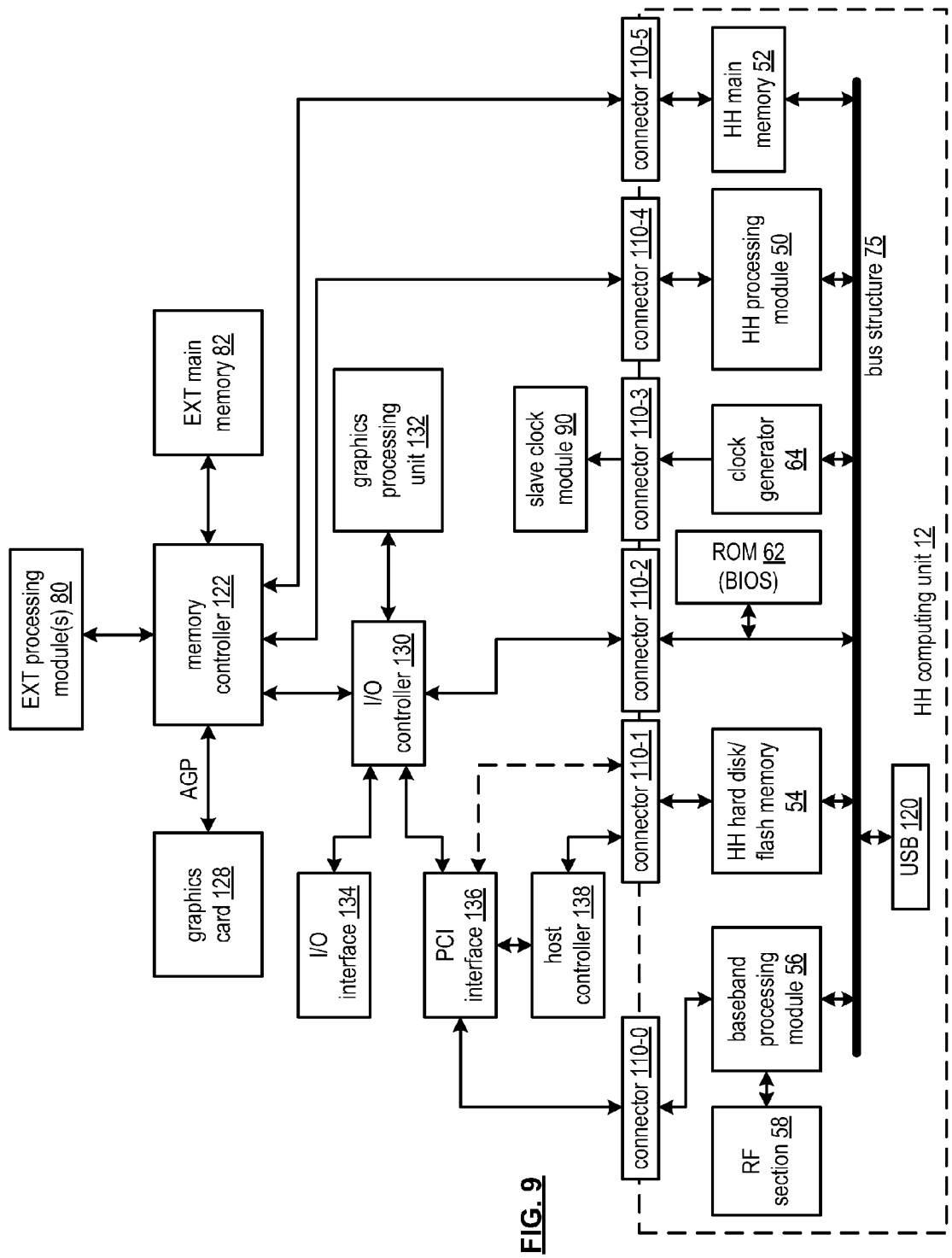
FIG. 9 is a schematic block diagram of an embodiment of core components of a handheld computing unit docked to an extended computing unit in accordance with the present invention.

FIG. 9 is a schematic block diagram of an embodiment of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, a universal serial bus (USB) interface 120, and the handheld connection structure 110A, which may be a combined connector or a plurality of connectors 110-1 through 110-5. The core components of the extended computing unit 14 include the corresponding connection structure 110B, one or more EXT processing modules 80, the EXT main memory 82, the slave clock module 90, a memory controller 122, a graphics card 128 and/or a graphics processing unit 132, an I/O controller 130, an I/O interface 134, a peripheral component interconnect (PCI) interface 136, and a host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system the computing device 10 is ready to execute a user application.

In an embodiment, the memory controller 122 coordinates the reading data from and writing data to the HH main memory 52 and the EXT main memory 82, by the processing modules 50 and 80, by the user I/O devices coupled directly or indirectly to the I/O controller, by the graphics card 128, and/or for data transfers with the HH and/or EXT hard disk/flash memory 54 and/or 84. Note that if the HH main memory 52 and/or the EXT main memory include DRAM, the memory controller 122 includes logic circuitry to refresh the DRAM.

The I/O controller 130 provides access to the memory controller 122 for typically slower devices. For example, the I/O controller 130 provides functionality for the PCI bus via the PCI interface 136; for the I/O interface 134, which may provide the interface for the keyboard, mouse, printer, and/or a removable CD/DVD disk drive; and BIOS interface; a direct memory access (DMA) controller, interrupt controllers, a host controller, which allows direct attached of the EXT hard disk memory; a real time clock, an audio interface. The I/O controller 130 may also include support for an Ethernet network card, a Redundant Arrays of Inexpensive Disks (RAID), a USB interface, and/or FireWire.

The graphics processing unit (GPU) 132 is a dedicated graphics rendering device for manipulating and displaying computer graphics. In general, the GPU implements a number of graphics primitive operations and computations for rendering two-dimensional and/or three-dimensional computer graphics. Such computations may include texture mapping, rendering polygons, translating vertices, programmable shaders, aliasing, and very high-precision color spaces. The GPU 132 may a separate module on a video card or it may be incorporated into the graphics card 128 that couples to the memory controller 122 via the accelerated graphics port (AGP). Note that a video card, or graphics accelerator, functions to generate the output images for the EXT display. In addition, the video card may further include functionality to support video capture, TV tuner adapter, MPEG-2 and MPEG-4 decoding or FireWire, mouse, light pen, joystick connectors, and/or connection to two monitors.

The EXT processing module 80, the memory controller 122, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the EXT processing module 80 and the memory controller 122 may be implemented on the same integrated circuit.

Figure 10:
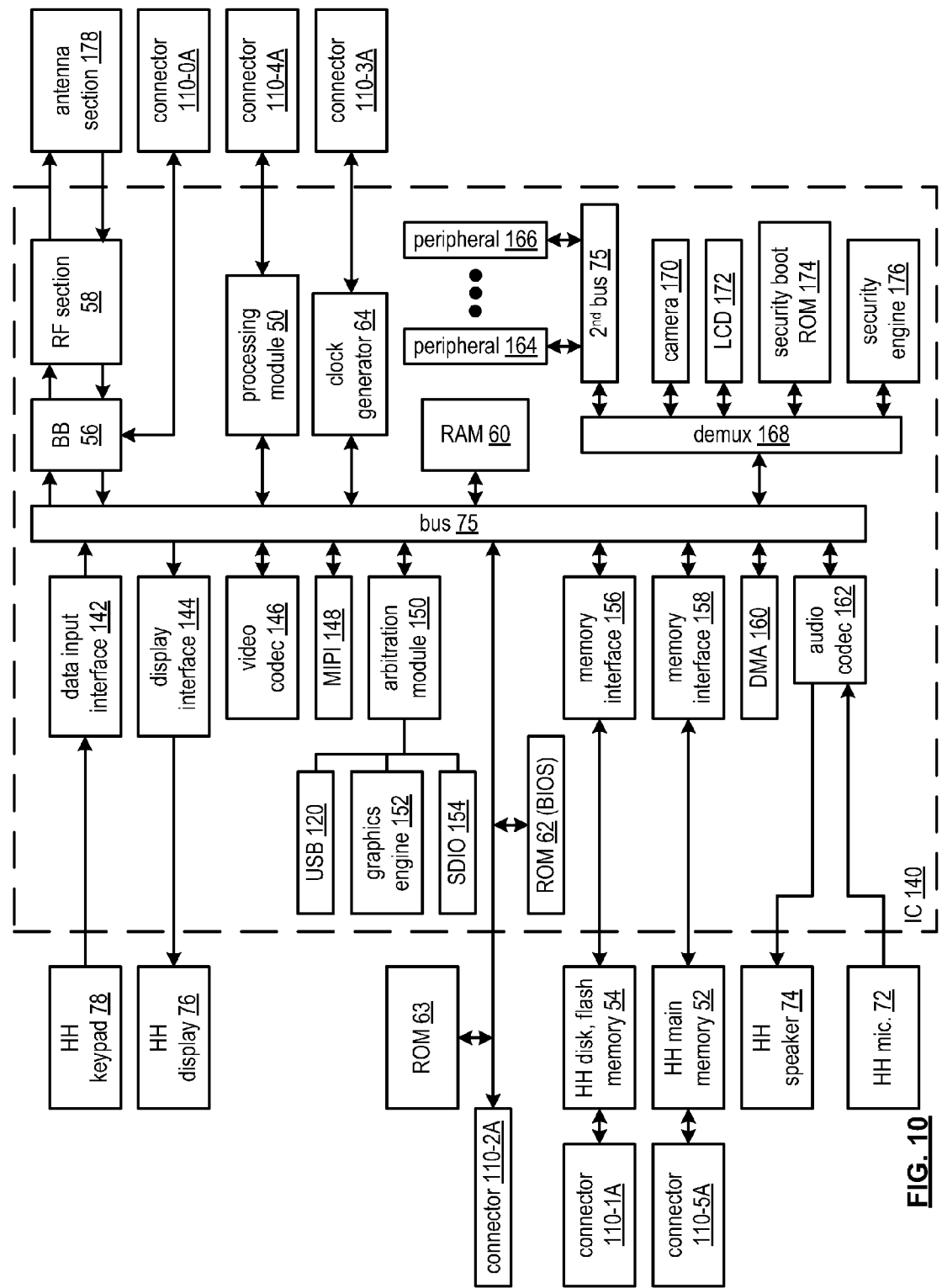
FIG. 10 is a schematic block diagram of an embodiment of a handheld computing unit in accordance with the present invention.

FIG. 10 is a schematic block diagram of an embodiment of a handheld computing unit 12 that may be used in the computing device 10 of FIG. 9. The handheld computing unit 12 includes an integrated circuit (IC) 140, the HH keypad, the HH display, the HH hard disk/flash memory 54, the HH main memory 52, the HH speaker 74, the HH microphone 72, the connection structure 110-1A through 110-5A, an antenna section 178, and may further include an off-chip ROM 63. The IC 140 includes the bus structure 75, the HH processing module 50, the baseband processing module 56, the RF section 58, the ROM 62, the clock generator circuit 64, a data input interface 142, a display interface 144, a video codec 146 (optional), a mobile industry processor interface (MIPI) interface 148 (optional), an arbitration module 150, a USB interface 120, a graphics engine 152, a secure digital input/output (SDIO) interface 154, a hard disk/flash memory interface 156, a main memory interface 158, a direct memory access (DMA) module 160, an audio codec 162, a demultiplexer 168, a plurality of peripheral interfaces 162-164, a digital camera interface 170, an LCD interface 172, a security boot ROM 174 (which may be included in ROM 62 or a separate ROM), and a security engine 176.

The plurality of peripheral interfaces 162-164 include two or more of: a SIM (Security Identification Module) card interface, a power management (PM) interface, a SD (Secure Digital) card or MMC (Multi Media Card) interface, a coprocessor interface, a Bluetooth (BT) transceiver interface, an FM tuner interface, a GPS receiver interface, a video sensor interface (e.g., a camcorder), a TV tuner interface, a universal subscriber identity module (USIM) interface, a second display interface, a Universal Asynchronous Receiver-Transmitter (UART) interface, a real time clock, and a general purpose I/O interface.

When the handheld computing unit 12 is docked with the extended computing unit 14, the HH processing module 50, the HH main memory 52, the HH hard disk/flash memory 54, the ROM 62, the clock generator circuit 64, and the HH bus structure 75 are coupled directly or indirectly to the memory controller 122 and/or the I/O controller 130 of the extended computing unit 14. In this mode, a docked mode operating system may activate as many or as few of the interfaces of the IC 140. For example, since the EXT display, mouse, keyboard, microphone, speakers and VoIP phone are enabled, the docked mode operating system may deactivate the data input interface 142, the display interface 144, the video codec 146, if included, the audio codec 162, the graphics engine 152, and the MIPI interface 148, if included.

As another example, the docked mode operating system may evoke the security functions provided by the security engine 176 and/or the security boot ROM 174. The security may be to allow/disallow access to certain resources (e.g., processing modules 50 and/or 80, files, privileged services calls, certain memory locations, etc.) based on the identity of the requestor. This may be done via an internal security process. In general, internal security protects the computer's resources from the programs that are concurrently running. In an embodiment, less privileged programs are blocked from certain instructions (e.g., read from or write to memory) and have to ask a higher privileged program to perform the instruction for it (e.g., an operating system kernel).

As yet another example, the docked mode operating system may active or deactivate one or more of the memory interfaces 156-158 depending on whether access to the HH main memory 52 and/or the HH hard disk/flash memory 54 is to be accessed via the HH bus structure 75 and/or via the memory controller 122 and/or the host controller 138. For instance, memory interface 158 may be activated such that the HH processing module 50 may access the HH main memory 52 via the bus 75 and memory interface 156 may be deactivated such that the HH hard disk/flash memory 54 is accessed via the host controller 138.

When the handheld computing unit 12 is in the remote mode, a remote mode operating system is active, which activates one or more of the interfaces. For example, the remote mode operating system will active the data input interface 142, the display interface 144, the audio codec 162, the graphics engine 152, the video codec 146, if included, and the MIPI interface 148, if included, to provide the user with character (e.g., voice, audio, video, image, text, graphics, etc.) input and output functionality via the handheld computing unit 12. In an embodiment, the graphic engine 152 render two-dimensional and/or three-dimensional graphics for display on the HH display 76 and/or storage in memory 52 and/or 54. The HH display 76 may include one or more display devices such as a liquid crystal (LCD) display, a plasma display, a digital light project (DLP) display, and/or any other type of portable video display. Accordingly, the display interface 144 would include software to facilitate the transfer of output video, graphics, and/or text to the HH display 76. Note that the MIPI interface may be used as an interface for a second HH display or instead of the display interface 144.

As another example, the remote mode operating system may activate the DMA module 160 such that one or more of the other interfaces may provide direct access to the HH main memory 52 without, or with minimal, involvement of the HH processing module 50. For instance, the camera interface 170 may be provided direct memory access to store a captured image and/or a captured video in the HH main memory 52 or in the HH hard disk/flash memory 54.

In an embodiment, the HH bus structure 75 may include one or more data lines, one or more instruction lines, and/or one or more control lines. For example, the HH bus structure 75 may include 16-128 lines for data and another 16-128 lines for instructions. In addition, the HH bus structure 75 may further include address lines for addressing the main memory 52.

In an embodiment, connections from the IC 140 to the connector 110 and/or to other components of the handheld computing unit 12 may be done via IC pins, via an RF interconnection, and/or a magnetic interconnection. Such an RF interconnection may be implemented as disclosed in co-pending patent applications (1) RF BUS CONTROLLER, having a Ser. No. 11/700,285, and a filing date of Jan. 31, 2007; (2) INTRA-DEVICE RF BUS AND CONTROL THEREOF, having a Ser. No. 11/700,421, and a filing date of Jan. 31, 2007; (3) SHARED RF BUS STRUCTURE, having a Ser. No. 11/700,517, and a filing date of Jan. 31, 2007; (4) RF TRANSCEIVER DEVICE WITH RF BUS, having a Ser. No. 11/700,592, and a filing date of Jan. 31, 2007; and (5) RF BUS ACCESS PROTOCOL AND TRANSCEIVER, having a Ser. No. 11/700,591, and a filing date of Jan. 31, 2007.

Figure 11:
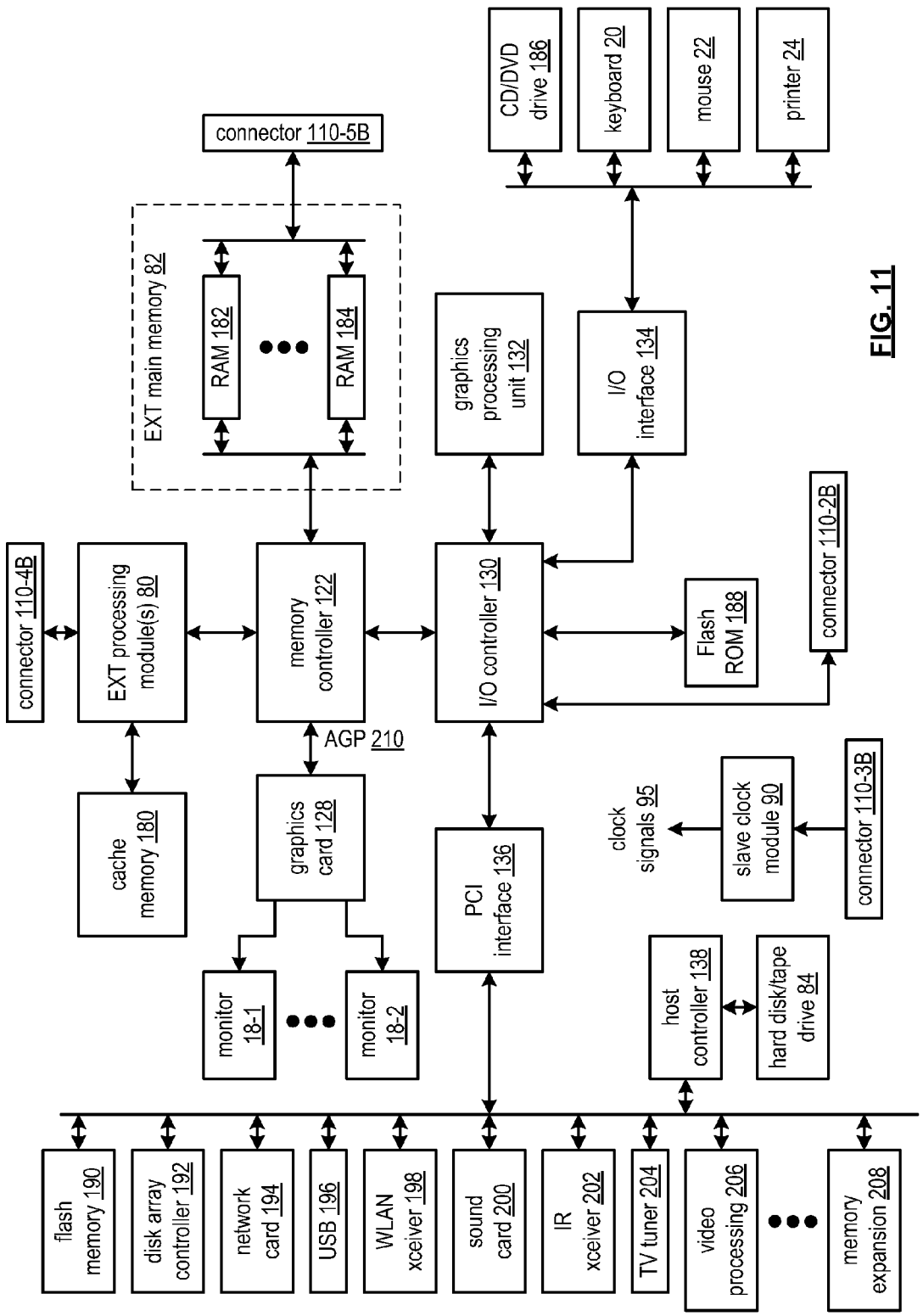
FIG. 11 is a schematic block diagram of an embodiment of an extended computing unit in accordance with the present invention.

FIG. 11 is a schematic block diagram of an embodiment of an extended computing unit 14 that may be used in the computing device 10 of FIG. 9. The extended computing unit 14 includes one or more monitors 18-1 through 18-2, the keyboard 20, the mouse 22, the printer 24, the EXT processing module 80, the EXT main memory 82, the EXT hard disk/flash/tape memory 84, the memory controller 122, the graphics card 128 and/or the graphics processing unit 132, the I/O controller 130, the I/O interface 134, the PCI interface 136, and the connector structure 110-1B through 110-5B. The extended computing unit 14 may further include one or more of a CD/DVD removable drive 186, a flash ROM 188, flash memory 190, a disk array controller 192, a network card 194, a USB connector 196, a WLAN transceiver 198 (e.g., baseband processing module 114 and RF section 116), a sound card 200, an infrared (IR) transceiver 202, a television (TV) tuner 204, a video processing module 206, and one or more memory expansion cards 208. The EXT main memory 82 may include a plurality of RAM ICs and/or RAM expansion cards 162-164.

In an embodiment, the EXT bus structure 112 includes an AGP bus 210 that couples the graphics card 128 to the memory controller 122, a memory bus that couples the memory controller 122 to the EXT main memory 82, a processor bus that couples the memory controller 122 to the EXT processing module 80, a PCI bus that couples a plurality of devices (e.g., devices 190-208) to the I/O controller 130 via the PCI interface 136, and an I/O bus that couples traditional I/O devices (e.g., keyboard 20, mouse 22, printer 24, and/or removable drive 186) to the I/O controller 130 via the I/O interface 134. In an embodiment, the I/O interface 134 may be omitted and the traditional I/O devices may be coupled to the PCI bus or via a USB connection.

Figure 12:
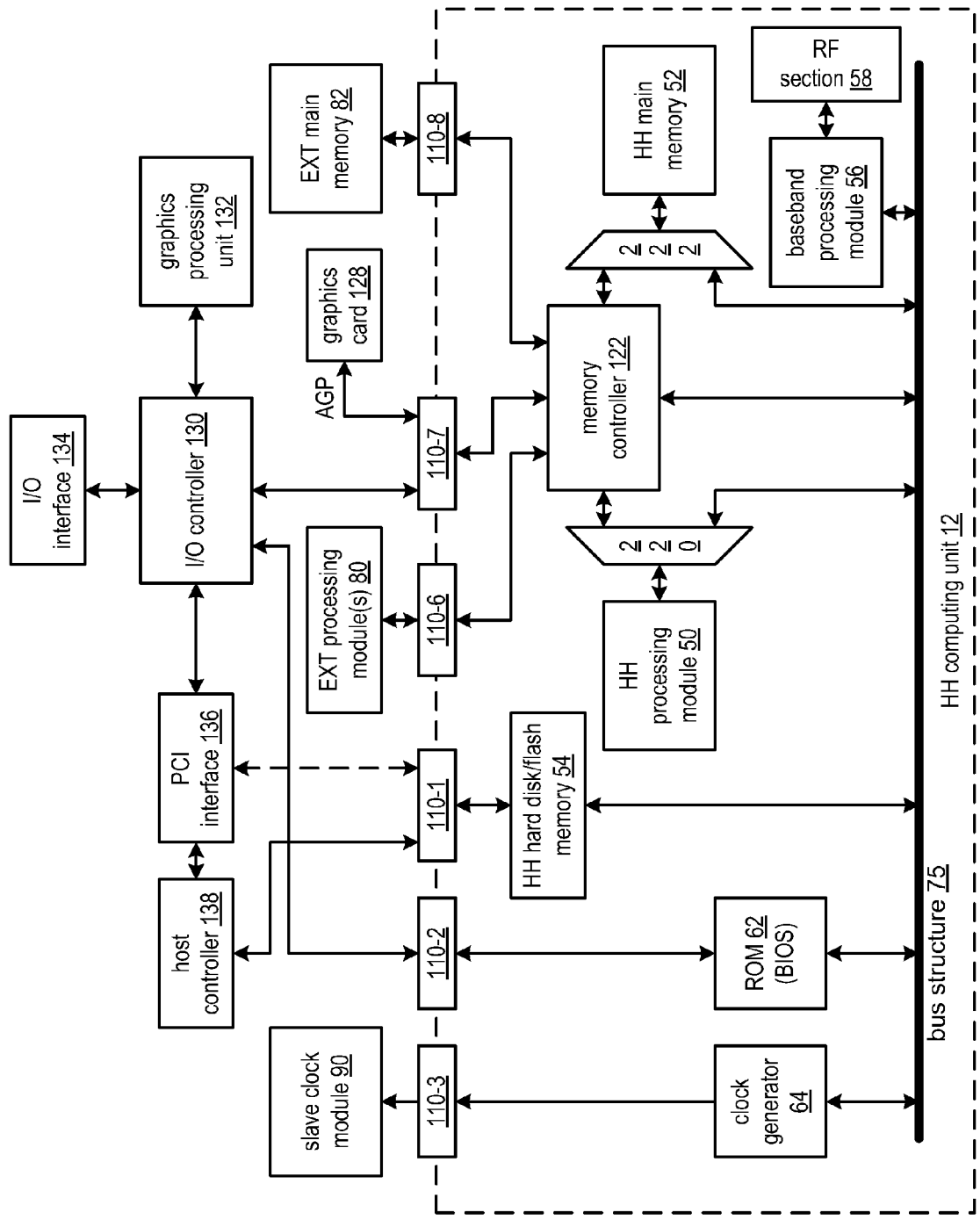
FIG. 12 is a schematic block diagram of another embodiment of core components of a handheld computing unit docked to an extended computing unit in accordance with the present invention.

FIG. 12 is a schematic block diagram of another embodiment of core components of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110A, which may be individual connections 110-1 through 110-8, the memory controller 122, and optional demultiplexers 220 and 222. The core components of the extended computing unit 14 include the corresponding connection structure 110B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-6 through 110-8. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

If the demultiplexers 220 and 222 are included, the memory controller 122 is coupled to the HH processing module 50 via demultiplexer 220 and is coupled to the HH main memory 52 via demultiplexer 222 when the handheld computing unit 12 is in the docked mode. When the handheld computing unit 12 is in the remote mode, the memory controller 122 may be deactivated such that the demultiplexers 220 and 222 couple the HH processing module 50 and the HH main memory 52 to the HH bus structure 75. If the demultiplexers 220 and 222 are not included, the memory controller 122 is on in both the docked and remote modes to coordinate reading from and writing to the HH main memory 52.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 13:
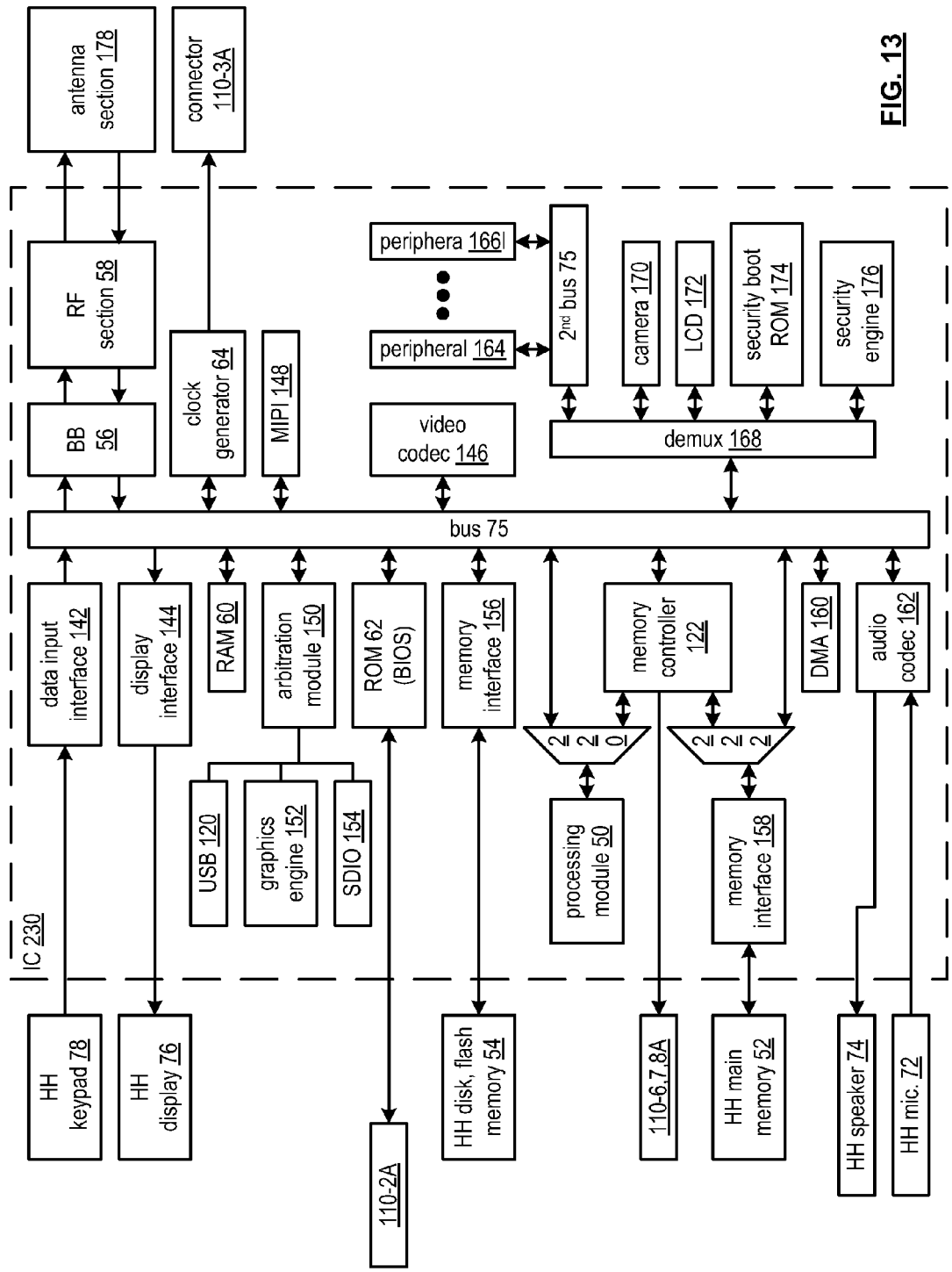
FIG. 13 is a schematic block diagram of another embodiment of a handheld computing unit in accordance with the present invention.

FIG. 13 is a schematic block diagram of another embodiment of a handheld computing unit 12 that may be used in the computing device 10 of FIG. 12. The handheld computing unit 12 includes an integrated circuit (IC) 230, the HH keypad, the HH display, the HH hard disk/flash memory 54, the HH main memory 52, the HH speaker 74, the HH microphone 72, the connection structure 110-1A through 110-5A, an antenna section 178, and may further include an off-chip ROM 63. The IC 140 includes the bus structure 75, the HH processing module 50, the baseband processing module 56, the RF section 58, the ROM 62, the clock generator circuit 64, the memory controller 122, demultiplexers 220 and 222 (optional), the data input interface 142, the display interface 144, the video codec 146 (optional), the mobile industry processor interface (MIPI) interface 148 (optional), the arbitration module 150, the USB interface 120, the graphics engine 152, the secure digital input/output (SDIO) interface 154, the hard disk/flash memory interface 156, the main memory interface 158, a direct memory access (DMA) module 160, an audio codec 162, the demultiplexer 168, the plurality of peripheral interfaces 162-164, the digital camera interface 170, the LCD interface 172, the security boot ROM 174 (which may be included in ROM 62 or a separate ROM), and the security engine 176.

When the handheld computing unit 12 is docked with the extended computing unit 14, the HH processing module 50, the HH main memory 52, the HH hard disk/flash memory 54, the ROM 62, the clock generator circuit 64, and the HH bus structure 75 are coupled to the memory controller 122 and/or to the I/O controller 130 of the extended computing unit 14. In this mode, a docked mode operating system may activate as many or as few of the interfaces of the IC 140. For example, since the EXT display, mouse, keyboard, microphone, speakers and VoIP phone are enabled, the docked mode operating system may deactivate the data input interface 142, the display interface 144, the video codec 146, if included, the audio codec 162, the graphics engine 152, and the MIPI interface 148, if included.

When the handheld computing unit 12 is in the remote mode, a remote mode operating system is active, which activates one or more of the interfaces. For example, the remote mode operating system will active the data input interface 142, the display interface 144, the audio codec 162, the graphics engine 152, the video codec 146, if included, and the MIPI interface 148, if included, to provide the user with character (e.g., voice, audio, video, image, text, graphics, etc.) input and output functionality via the handheld computing unit 12.

As another example, the remote mode operating system may activate the DMA module 160 such that one or more of the other interfaces may provide direct access to the HH main memory 52 without, or with minimal, involvement of the HH processing module 50. In addition, the remote operating system may activate or deactivate the memory controller 122 depending on how HH main memory 52 is to be accessed and/or how involvement of the HH processing module 50 is to be controlled.

Figure 14:
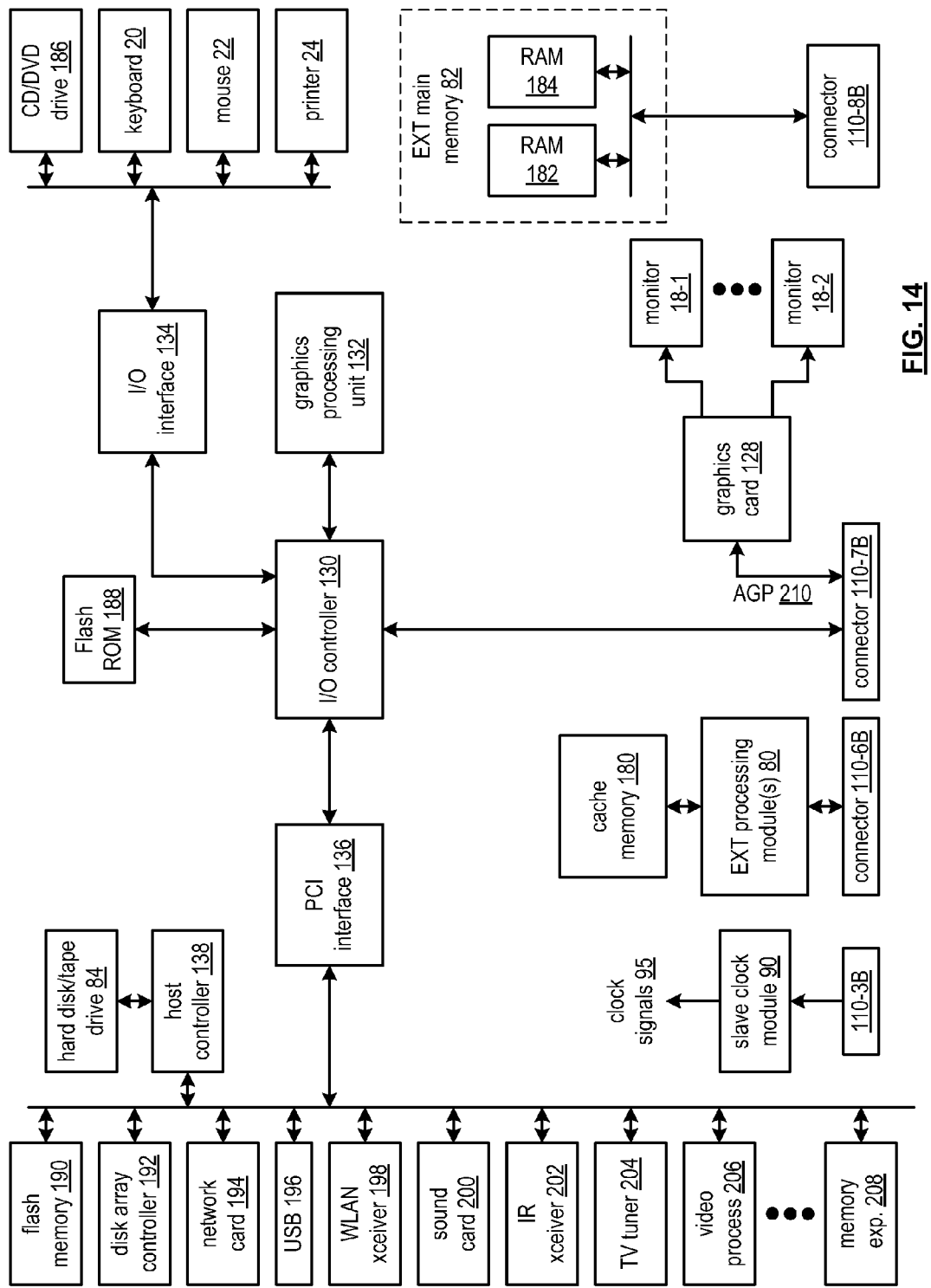
FIG. 14 is a schematic block diagram of another embodiment of an extended computing unit in accordance with the present invention.

FIG. 14 is a schematic block diagram of another embodiment of an extended computing unit 14 that may be used in the computing device 10 of FIG. 12. The extended computing unit 14 includes one or more monitors 18-1 through 18-2, the keyboard 20, the mouse 22, the printer 24, the EXT processing module 80, the EXT main memory 82, the EXT hard disk/flash/tape memory 84, the graphics card 128 and/or the graphics processing unit 132, the I/O controller 130, the I/O interface 134, the PCI interface 136, and the connector structure 110-1B through 110-8B. The extended computing unit 14 may further include one or more of a CD/DVD removable drive 186, a flash ROM 188, flash memory 190, a disk array controller 192, a network card 194, a USB connector 196, a WLAN transceiver 198 (e.g., baseband processing module 114 and RF section 116), a sound card 200, an infrared (IR) transceiver 202, a television (TV) tuner 204, a video processing module 206, and one or more memory expansion cards 208. The EXT main memory 82 may include a plurality of RAM ICs and/or RAM expansion cards 162-164.

In an embodiment, the EXT bus structure 112 includes an AGP bus 210 that couples the graphics card 128 to connector 110 for coupled to the memory controller 122, a memory bus that couples the memory controller 122 via the connector 110 to the EXT main memory 82, a processor bus that couples the memory controller 122 via the connector 110 to the EXT processing module 80, a PCI bus that couples a plurality of devices (e.g., devices 190-208) to the I/O controller 130 via the PCI interface 136, and an I/O bus that couples traditional I/O devices (e.g., keyboard 20, mouse 22, printer 24, and/or removable drive 186) to the I/O controller 130 via the I/O interface 134. In an embodiment, the I/O interface 134 may be omitted and the traditional I/O devices may be coupled to the PCI bus or via a USB connection.

Figure 15:
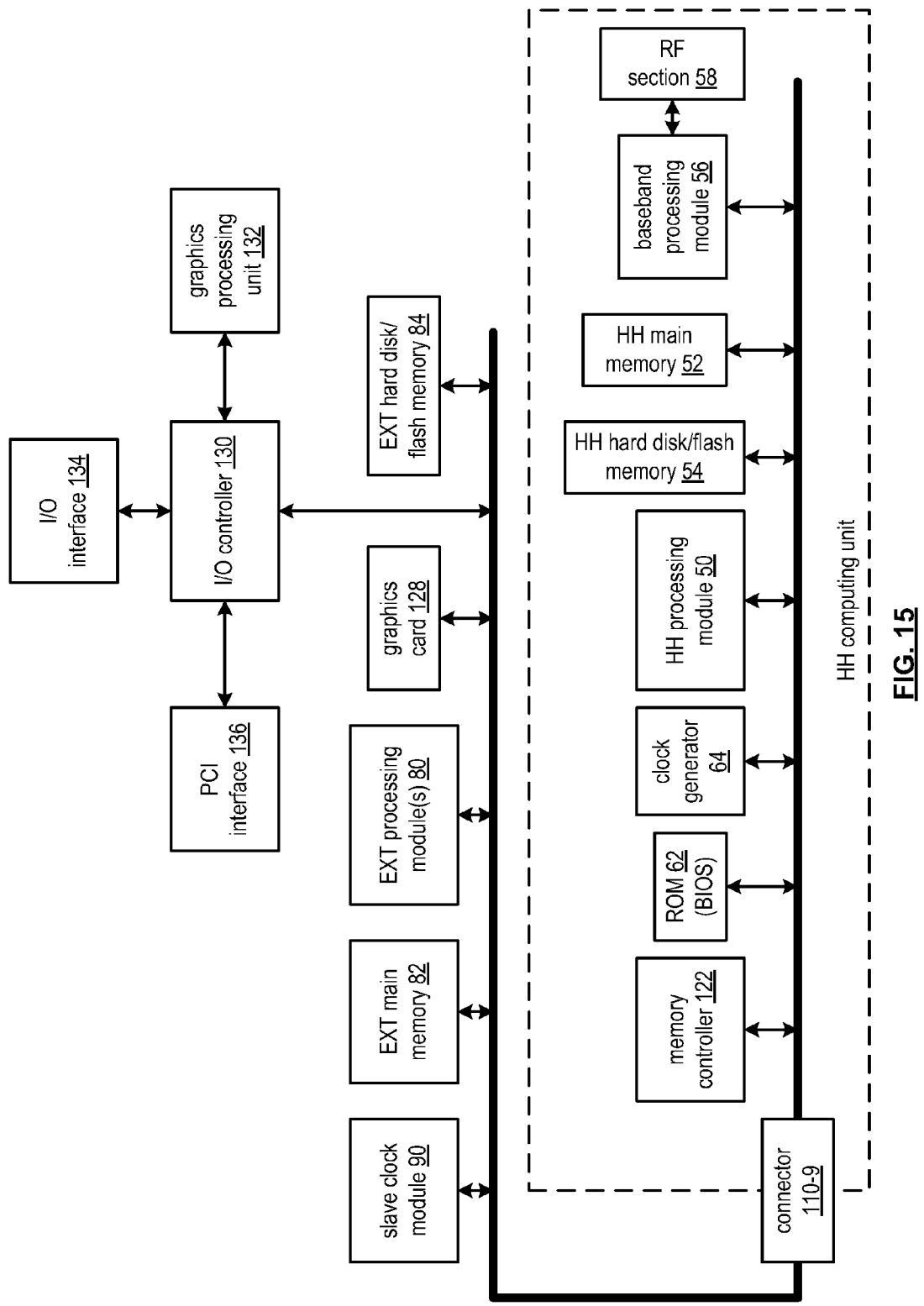
FIG. 15 is a schematic block diagram of another embodiment of core components of a handheld computing unit docked to an extended computing unit in accordance with the present invention.

FIG. 15 is a schematic block diagram of another embodiment of core components of a handheld computing unit 12 docked to an extended computing unit 14. The core components of the handheld computing unit 12 include the HH processing module 50, the HH main memory 52, the HH hard disk/flash memory 54, the baseband processing module 56, the RF section 58, the ROM 62, the handheld connection structure 110-9A, and the memory controller 122. The core components of the extended computing unit 14 include the corresponding connection structure 110-9B, one or more EXT processing modules 80, the EXT main memory 82, the slave clock module 90, the graphics card 128 and/or the graphics processing unit 132, the I/O controller 130, the I/O interface 134, the PCI interface 136, and the host controller 138.

With handheld computing unit 12 docked to the extended computing unit 14, the core components of units 12 and 14 function as a single computing device 10. As such, when the computing device 10 is enabled, the BIOS stored on the HH ROM 62 is executed to boot up the computing device. After initializing the operating system, the computing device 10 is ready to execute a user application.

In an embodiment, the memory controller 122 is within the handheld computing unit 12 and is coupled to the I/O controller 130, the graphics card 128, the EXT processing module 80, and the EXT main memory via the connector structure 110-9. When connected, the memory controller 122 coordinates the reading data from and writing data to the HH main memory 52 and the EXT main memory 82, by the processing modules 50 and 80, by the user I/O devices coupled directly or indirectly to the I/O controller 130, by the graphics card 128, and/or for data transfers with the HH and/or the EXT hard disk/flash memory 54 and/or 84.

Within the extended computing unit, the EXT processing module 80, the EXT main memory 82, the I/O controller 130, the I/O interface 134, the PCI interface 136, and the host controller 138 may be implemented on a single integrated circuit, each on separate integrated circuits, or some elements may be implemented on the same integrated circuits. For example, the I/O controller 130, the I/O interface 134, the PCI interface 136, and the host controller 138 may be implemented on the same integrated circuit.

Figure 16:
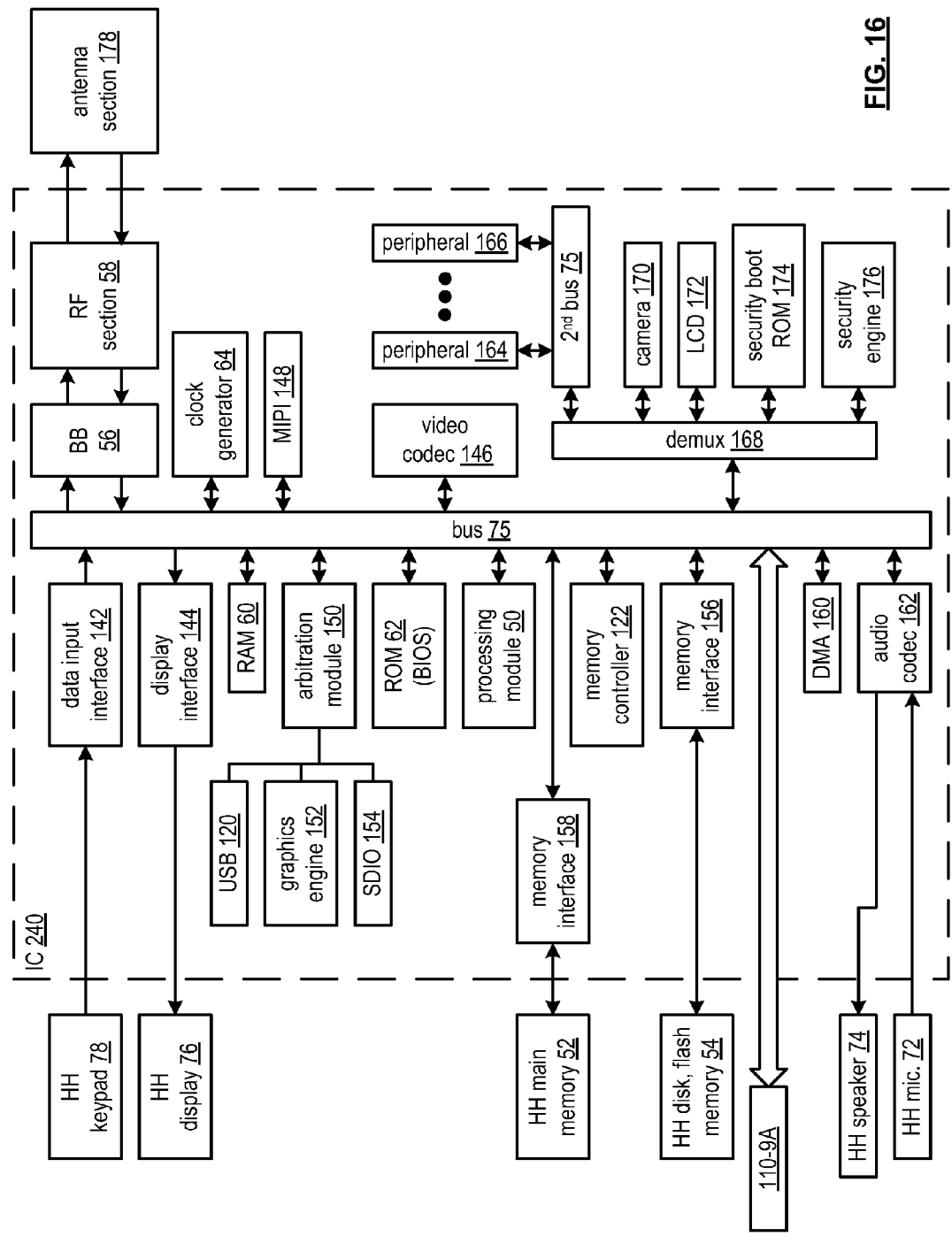
FIG. 16 is a schematic block diagram of another embodiment of a handheld computing unit in accordance with the present invention.

FIG. 16 is a schematic block diagram of another embodiment of a handheld computing unit 12 that may be used in the computing device 10 of FIG. 15. The handheld computing unit 12 includes an integrated circuit (IC) 230, the HH keypad, the HH display, the HH hard disk/flash memory 54, the HH main memory 52, the HH speaker 74, the HH microphone 72, the connection structure 110-9A, an antenna section 178, and may further include an off-chip ROM 63. The IC 140 includes the bus structure 75, the HH processing module 50, the baseband processing module 56, the RF section 58, the ROM 62, the clock generator circuit 64, the memory controller 122, demultiplexers 220 and 222 (optional), the data input interface 142, the display interface 144, the video codec 146 (optional), the mobile industry processor interface (MIPI) interface 148 (optional), the arbitration module 150, the USB interface 120, the graphics engine 152, the secure digital input/output (SDIO) interface 154, the hard disk/flash memory interface 156, the main memory interface 158, a direct memory access (DMA) module 160, an audio codec 162, the demultiplexer 168, the plurality of peripheral interfaces 162-164, the digital camera interface 170, the LCD interface 172, the security boot ROM 174 (which may be included in ROM 62 or a separate ROM), and the security engine 176.

When the handheld computing unit 12 is docked with the extended computing unit 14, the HH processing module 50, the HH main memory 52, the HH hard disk/flash memory 54, the ROM 62, the clock generator circuit 64, and the HH bus structure 75 are coupled to the memory controller 122 and/or to the I/O controller 130 of the extended computing unit 14. In this mode, a docked mode operating system may activate as many or as few of the interfaces of the IC 140. For example, since the EXT display, mouse, keyboard, microphone, speakers and VoIP phone are enabled, the docked mode operating system may deactivate the data input interface 142, the display interface 144, the video codec 146, if included, the audio codec 162, the graphics engine 152, and the MIPI interface 148, if included.

When the handheld computing unit 12 is in the remote mode, a remote mode operating system is active, which activates one or more of the interfaces. For example, the remote mode operating system will active the data input interface 142, the display interface 144, the audio codec 162, the graphics engine 152, the video codec 146, if included, and the MIPI interface 148, if included, to provide the user with character (e.g., voice, audio, video, image, text, graphics, etc.) input and output functionality via the handheld computing unit 12.

As another example, the remote mode operating system may activate the DMA module 160 such that one or more of the other interfaces may provide direct access to the HH main memory 52 without, or with minimal, involvement of the HH processing module 50. In addition, the remote operating system may activate or deactivate the memory controller 122 depending on how HH main memory 52 is to be accessed and/or how involvement of the HH processing module 50 is to be controlled.

In this embodiment, the connector structure 110-9 functions to couple the HH bus structure 75 to the EXT bus structure 112. As such, when coupled, the handheld computing unit 12 and the extended computing unit 14 share a common bus structure, which may be controlled by a bus controller of the memory controller 122 and/or of the HH processing module 50. In general, the bus controller controls access to the shared bus using one or more scheduling functions of first come first serve, shorted job first, shortest remaining time first, a round robin scheme, a priority scheme, etc.

Figure 17:
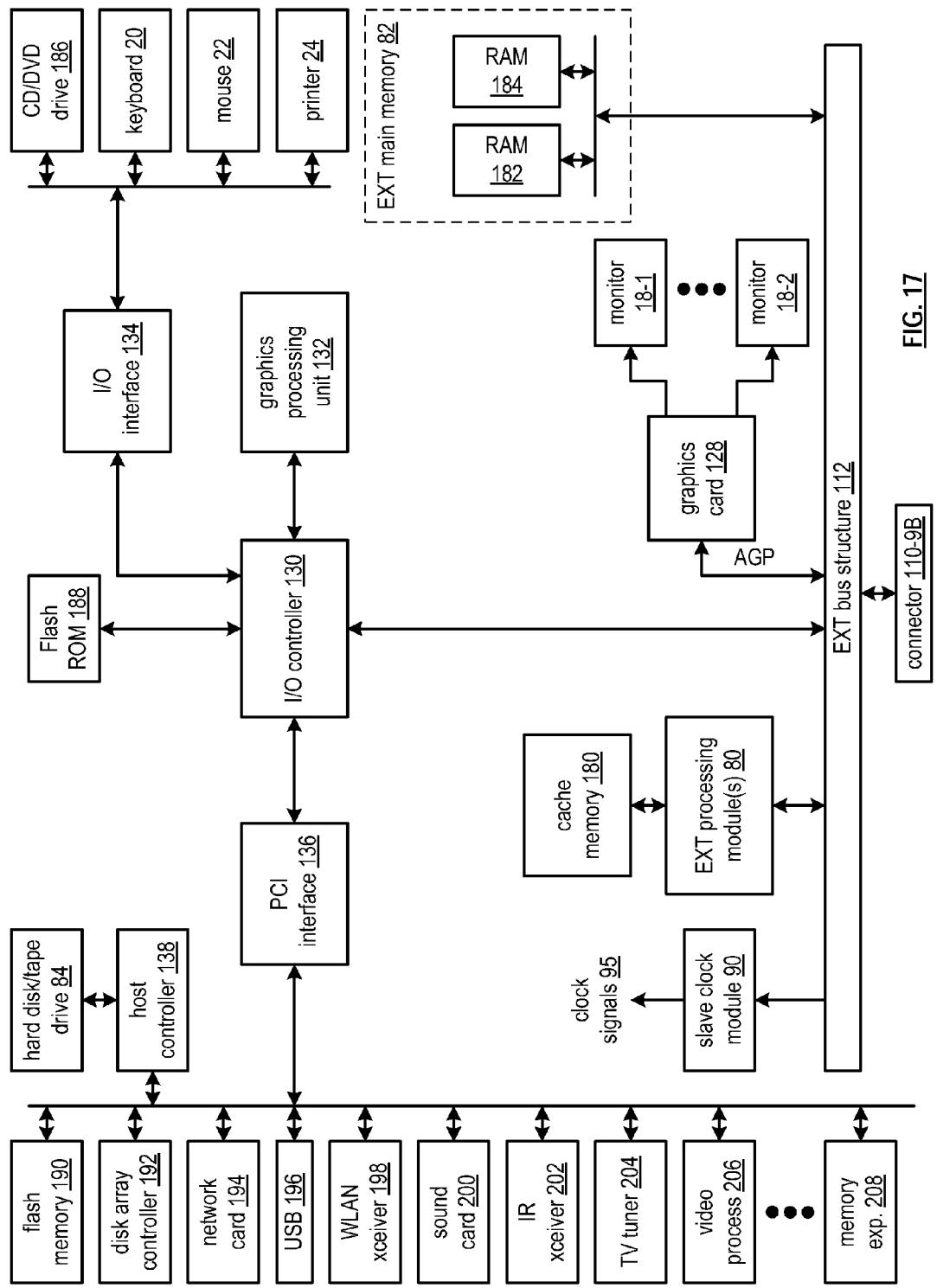
FIG. 17 is a schematic block diagram of another embodiment of an extended computing unit in accordance with the present invention.

FIG. 17 is a schematic block diagram of another embodiment of an extended computing unit 14 that may be used in the computing device 10 of FIG. 15. The extended computing unit 14 includes one or more monitors 18-1 through 18-2, the keyboard 20, the mouse 22, the printer 24, the EXT processing module 80, the EXT main memory 82, the EXT hard disk/flash/tape memory 84, the graphics card 128 and/or the graphics processing unit 132, the I/O controller 130, the I/O interface 134, the PCI interface 136, the EXT bus structure 112, and the connector structure 110-9B. The extended computing unit 14 may further include one or more of a CD/DVD removable drive 186, a flash ROM 188, flash memory 190, a disk array controller 192, a network card 194, a USB connector 196, a WLAN transceiver 198 (e.g., baseband processing module 114 and RF section 116), a sound card 200, an infrared (IR) transceiver 202, a television (TV) tuner 204, a video processing module 206, and one or more memory expansion cards 208. The EXT main memory 82 may include a plurality of RAM ICs and/or RAM expansion cards 162-164.

In an embodiment, the EXT bus structure 112 is coupled to the connection 110-9B such that the EXT bus structure 112 and the HH bus structure 75 become a shared bus structure. In an embodiment, the I/O interface 134 may be omitted and the traditional I/O devices may be coupled to the PCI bus or via a USB connection.

Figure 18:
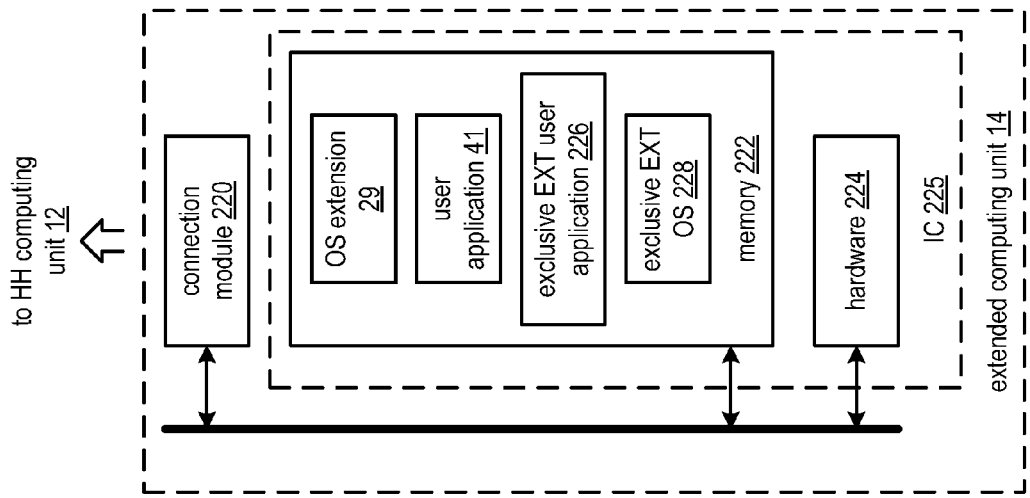
FIG. 18 is a schematic block diagram of another embodiment of an extended computing unit in accordance with the present invention.

FIG. 18 is a schematic block diagram of another embodiment of an extended computing unit 14 that includes a connection module 220, memory 222, and hardware 224. The memory 222 may store an operating system (OS) extension 29, one or more user applications 41, one or more exclusive EXT user applications 226, and an exclusive EXT operating system 228. In an embodiment, the one or more exclusive extended computing unit user applications includes a voice over internet application, an internet radio application, an internet television application, an internet video playback application, and/or an entertainment device control application.

In an example of operation, when the connection module 220 (e.g., the EXT portion of connection 110 in FIGS. 7-17) is not coupled to a handheld computing unit 12, the hardware 224 is operable to execute the extended computing unit exclusive operating system 226 from memory 222, which may include EXT main memory, EXT RAM, EXT hard disk and/or flash memory. The exclusive EXT operation system 226 may be conventional operating system, may be similar to the core operating system stored in the HH computing unit, or a custom operating system.

While executing the exclusive EXT operating system, the hardware 224 is operable to detect a request for activation of an extended computing unit exclusive user application 226. In this instance, the hardware 224 executes a least a portion of the extended computing unit exclusive user application. For example, when the HH computing unit 12 is not docked to the EXT computing unit 12, the EXT computing unit 12 can support non-mobile functions such as a VoIP telephone, internet radio, internet TV, etc.

The hardware 224 may include one or more of: a processing module, a memory controller, an input/output controller, an input/output interface module, a peripheral component interface module, a graphics processing unit, and a graphics card interface module. Various embodiments of the hardware 224 were previously described with reference to FIGS. 7-17. Note that the hardware 224 and the memory 222 may be implemented on an integrated circuit 225.

Figure 19:
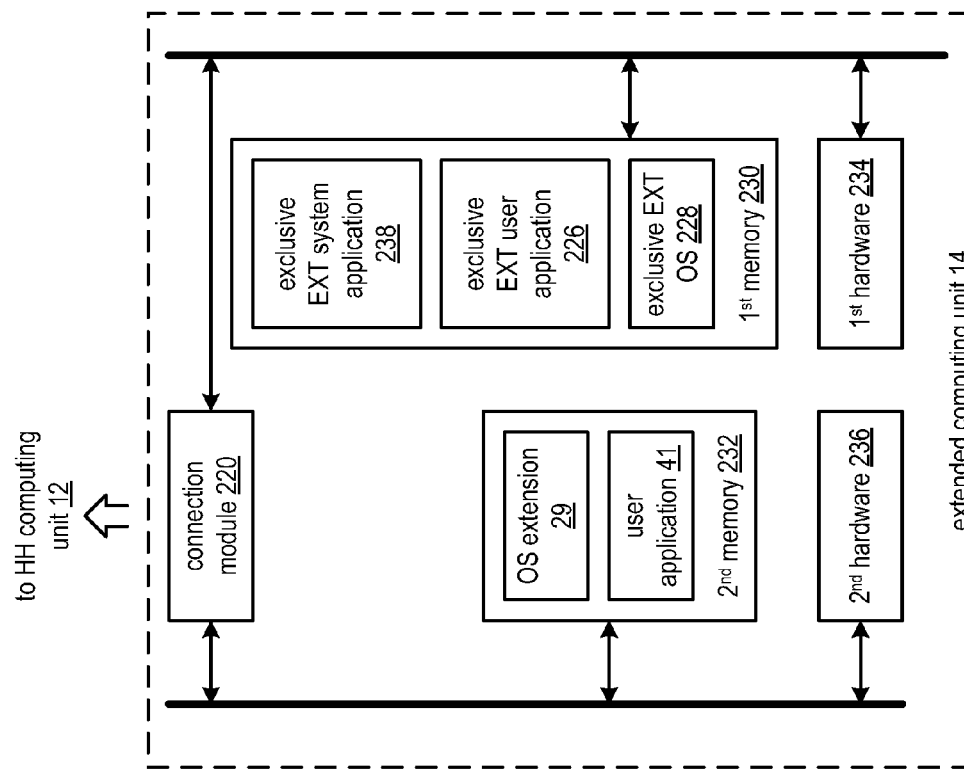
FIG. 19 is a schematic block diagram of another embodiment of an extended computing unit in accordance with the present invention.

FIG. 19 is a schematic block diagram of another embodiment of an extended computing unit 14 that includes a connection module 220, 1st memory 230, 2nd memory 232, 1st hardware 234, and 2nd hardware 236. The 1st memory 230 may store the one or more exclusive EXT user applications 226 and the exclusive EXT operating system 228 and the 2nd memory 232 may store the operating system (OS) extension 29 and one or more user applications 41. In an embodiment, the 1st hardware 234 may be a processing module coupled to the memory 232 and the 2nd hardware 236 may be the EXT hardware 25. As a further embodiment, the 1st memory 230 may store one or more exclusive extended computing unit system applications 226.

In an example of operation, when the connection module 220 (e.g., the EXT portion of connection 110 in FIGS. 7-17) is not coupled to a handheld computing unit 12, the 1st hardware 234 is operable to execute the extended computing unit exclusive operating system 226 from 1st memory 230. In this state, the 2nd hardware 236 and the 2nd memory 232 are inactive, or idle.

While executing the exclusive EXT operating system, the 1st hardware 234 is operable to detect a request for activation of an extended computing unit exclusive user application 226. In this instance, the 1st hardware 234 executes a least a portion of the extended computing unit exclusive user application. For example, when the HH computing unit 12 is not docked to the EXT computing unit 12, the EXT computing unit 12 can support non-mobile functions such as a VoIP telephone, internet radio, internet TV, etc.

FIG. 20 is a schematic block diagram of another embodiment of a computing device 10 that includes a handheld computing unit 12 docked, or quasi-docked, with an extended computing unit 14. In this diagram, the computing device 10 includes an application block, an application programming interfaces (API) block, operating system block (OS), and a hardware block (HW). The application block includes the EXT only applications 230 and the computer level applications 39, which include the applications 41 on the HH computing unit 12 and the applications 43 on the EXT computing unit 14.

The hardware block includes the core hardware 23 on the handheld (HH) computing unit 12 and hardware 224 of the EXT computing unit 14. As described in FIG. 7-17, the hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The hardware 224 of the EXT computing unit 14 may include one or more of: a hard disk and/or flash memory, main memory, a co-processing module, RAM, ROM, slave clock circuitry, an audio IO interface, a video IO interface, a data IO interface, and may further include a memory controller.

In this instance, the hardware of the HH computing unit 12 is the core hardware of the computing device 10 and the hardware 224 of the EXT computing unit 14 provides an extension of the HH hardware 23. For example, the processing module of the HH computing unit 12 may use the processing module of the EXT computing unit 14 as a co-processor, as an auxiliary processor, as part of a multiple-processor core, or not use it at all. As another example, the HH computing unit 12 may use the main memory of the EXT computing unit 14 as an extension of its main memory, as an auxiliary main memory (e.g., use as a backup copy), as a second layer of cache (e.g., L1 or L2 cache), or not use it at all. In addition, the exclusive EXT hardware 234 enables the EXT computing unit 14 to support exclusive EXT applications 230.

The operating system block includes the EXT only OS 226 and the computer level operating system 27, which includes the core operating system 29 stored in memory of the HH computing device 12 and the operating system extension 31 stored on the EXT computing unit 14. In general, the core operating system 29 provides the primary operating system for the computing device 10 and the EXT operating system 31 augments the primary operating system for further functionality when the HH computing unit 12 is docked to the EXT computing unit 14. Further, the exclusive EXT operating system 226 provides the functions as previously described with reference to FIGS. 18 and 19.

The API block includes the exclusive EXT API 228 and the computer level API 33, which includes APIs 35 that are stored on the HH computing unit 12 and APIs 37 that are stored on the EXT computing unit 14. Similarly, applications block includes the exclusive EXT applications 230 and the computer level applications 39, which include applications 41 that are stored on the HH computing unit 12 and applications 43 stored on the EXT computing unit 14.

FIG. 21 is a schematic block diagram of another embodiment of a computing device 10 where the handheld computing unit 12 is not docked to an extended computing unit 14. In this instance, HH computing unit 12 functions as a stand-alone mobile device while the EXT computing unit 14 is substantially non-operational for the extension applications 42, the extension operating system 31, and the extension APIs 37, but is operational for the exclusive EXT applications 230, the exclusive EXT APIs 228, and the exclusive EXT operating system 226. As shown, the architecture of the HH computing unit 12 includes vertical functional coupling of the hardware 23, the operating system 29, the API 35, and the applications 41. As is also shown, the EXT computing unit 14 does not include vertical functional coupling for the extension blocks since each of the blocks (e.g., hardware 25, operating system 31, API 37, and applications 43) are extensions of the corresponding blocks of the HH computing unit 12. However, the EXT computing unit 14 does include vertical functional coupling for the exclusive EXT functions as previously described.

Figure 22:
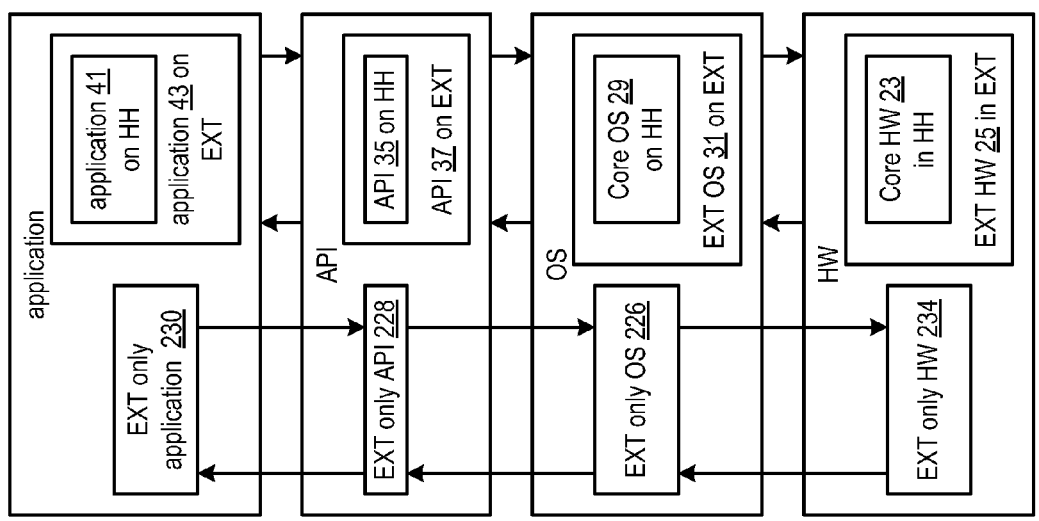
FIG. 22 is a schematic block diagram of another embodiment of a computing device where a handheld computing unit is docked to an extended computing unit in accordance with the present invention.

FIG. 22 is a schematic block diagram of another embodiment of a computing device 10 that includes a handheld computing unit 12 docked, or quasi-docked, with an extended computing unit 14. In this diagram, the computing device 10 includes an application block, an application programming interfaces (API) block, operating system block (OS), and a hardware block (HW). The application block includes the EXT only applications 230 and the computer level applications 39, which include the applications 41 on the HH computing unit 12 and the applications 43 on the EXT computing unit 14.

The hardware block includes the exclusive EXT hardware 234 and the computer level hardware 21, which includes the core hardware 23 on the handheld (HH) computing unit 12 and hardware 25 of the EXT computing unit 14. As described in FIG. 7-17, the hardware of the HH computing unit 12 may include one or more of: a radio frequency (RF) section, a baseband processing module, a hard disk and/or flash memory, main memory, a processing module, RAM, ROM, clock circuitry, an audio IO interface, a video IO interface, a data IO interface, and may further include a memory controller. The hardware 234 of the EXT computing unit 14 may include one or more of: a hard disk and/or flash memory, main memory, a co-processing module, RAM, ROM, slave clock circuitry, an audio IO interface, a video IO interface, a data IO interface, and may further include a memory controller.

In this instance, the hardware of the HH computing unit 12 is the core hardware of the computing device 10 and the hardware 25 of the EXT computing unit 14 provides an extension of the HH hardware 23. For example, the processing module of the HH computing unit 12 may use the processing module of the EXT computing unit 14 as a co-processor, as an auxiliary processor, as part of a multiple-processor core, or not use it at all. As another example, the HH computing unit 12 may use the main memory of the EXT computing unit 14 as an extension of its main memory, as an auxiliary main memory (e.g., use as a backup copy), as a second layer of cache (e.g., L1 or L2 cache), or not use it at all. In addition, the exclusive EXT hardware 234 enables the EXT computing unit 14 to support exclusive EXT applications 230.

The operating system block includes the EXT only OS 226 and the computer level operating system 27, which includes the core operating system 29 stored in memory of the HH computing device 12 and the operating system extension 31 stored on the EXT computing unit 14. In general, the core operating system 29 provides the primary operating system for the computing device 10 and the EXT operating system 31 augments the primary operating system for further functionality when the HH computing unit 12 is docked to the EXT computing unit 14. Further, the exclusive EXT operating system 226 provides the functions as previously described with reference to FIGS. 18 and 19.

The API block includes the exclusive EXT API 228 and the computer level API 33, which includes APIs 35 that are stored on the HH computing unit 12 and APIs 37 that are stored on the EXT computing unit 14. Similarly, applications block includes the exclusive EXT applications 230 and the computer level applications 39, which include applications 41 that are stored on the HH computing unit 12 and applications 43 stored on the EXT computing unit 14.

Figure 23:
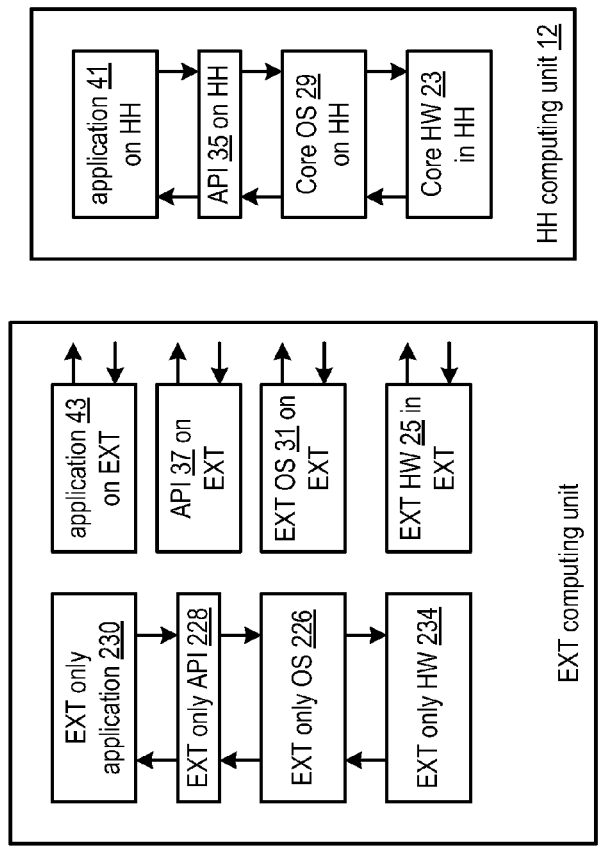
FIG. 23 is a schematic block diagram of another embodiment of a computing device where a handheld computing unit is not docked to an extended computing unit in accordance with the present invention.

FIG. 23 is a schematic block diagram of another embodiment of a computing device 10 where the handheld computing unit 12 is not docked to an extended computing unit 14. In this instance, HH computing unit 12 functions as a stand-alone mobile device while the EXT computing unit 14 is substantially non-operational for the extension applications 42, the extension operating system 31, and the extension APIs 37, but is operational for the exclusive EXT applications 230, the exclusive EXT APIs 228, and the exclusive EXT operating system 226. As shown, the architecture of the HH computing unit 12 includes vertical functional coupling of the hardware 23, the operating system 29, the API 35, and the applications 41. As is also shown, the EXT computing unit 14 does not include vertical functional coupling for the extension blocks since each of the blocks (e.g., hardware 25, operating system 31, API 37, and applications 43) are extensions of the corresponding blocks of the HH computing unit 12. However, the EXT computing unit 14 does include vertical functional coupling for the exclusive EXT functions as previously described.

Figure 24:
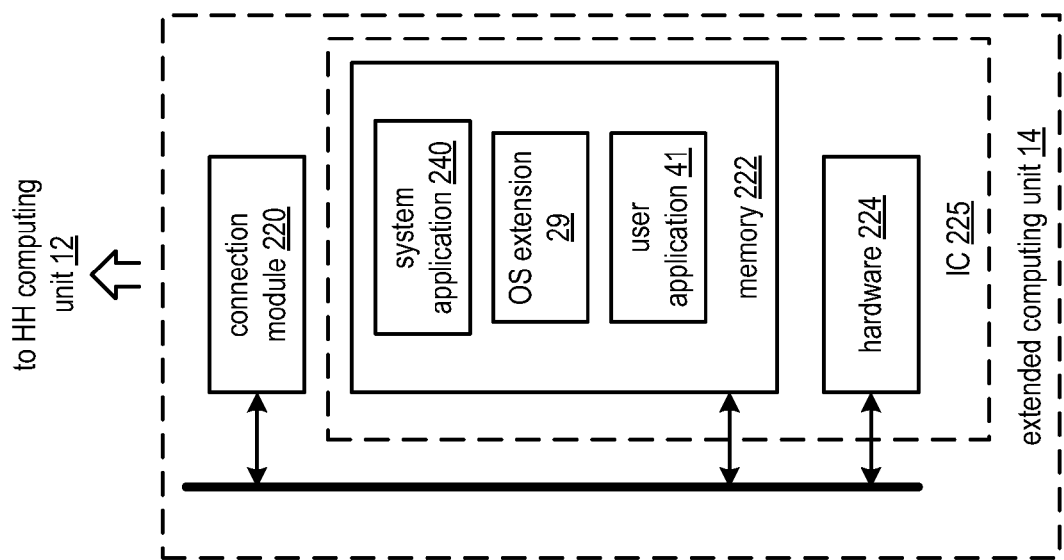
FIG. 24 is a schematic block diagram of another embodiment of an extended computing unit in accordance with the present invention.

FIG. 24 is a schematic block diagram of another embodiment of an extended computing unit 14 that includes the hardware 224, the memory 222, and the connection module 220. Note that the memory 222 and the hardware 224 may be implemented on an integrated circuit 225.

In an example of operation, the memory 222 stores one or more computer-level user applications 41 and an operating system extension of a computer-level operating system 29. The memory 222 may further store a computer-level system application 240. When the connection module 230 is coupled to a handheld computing unit 12, the hardware 224 is operable, in combination with hardware of the handheld computing unit, to execute at least one of: at least a portion of a computer-level user application of the one or more computer-level user applications, and at least a portion of the operating system extension. In addition, the hardware is operable, in combination with hardware of the handheld computing unit, to execute at least a portion of a computer-level system application 240.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An extended computing unit comprises:
   a connection module;
   memory operable to store:
   one or more computer-level user applications executable by a handheld computing unit or by the handheld computing unit in combination with the extended computing unit;
   one or more exclusive extended computing unit user applications executable by the extended computing unit apart from the handheld computing unit;
   an exclusive extended computing unit operating system executable by the extended computing unit apart from the handheld computing unit; and an operating system extension of a computer-level operating system, the operating system extension operable to augment a primary operating system executed by the handheld computing unit when the connection module is coupled to the handheld computing unit; and hardware coupled to the connection module and to the memory, wherein, when the connection module is not coupled to the handheld computing unit, the hardware is operable to:
execute the extended computing unit exclusive operating system;
detect a request for activation of an extended computing unit exclusive user application of the one or more extended computing unit exclusive user applications; and
execute a least a portion of the extended computing unit exclusive user application.

2. The extended computing unit of claim 1, wherein the memory comprises:
first memory for storing the one or more exclusive extended computing unit user applications and the exclusive extended computing unit operating system; and
second memory for storing the one or more computer-level user applications and the operating system extension of a computer-level operating system.

3. The extended computing unit of claim 1, wherein the hardware comprises:
first hardware for executing the extended computing unit exclusive operating system, detecting the request for activation of the extended computing unit exclusive user application, and executing the least a portion of the extended computing unit exclusive user application; and
second hardware operable when the connection module is connected to the handheld computing, wherein the second hardware executes, in combination with hardware of the handheld computing unit, at least one of:
at least a portion of a computer-level user application of the one or more computer-level user applications; and
at least a portion of the operating system extension.

4. The extended computing unit of claim 1 further comprises the memory operable to:
store one or more exclusive extended computing unit system applications.

5. The extended computing unit of claim 1, wherein the hardware comprises at least one of:
a processing module;
a memory controller;
an input/output controller;
an input/output interface module;
a peripheral component interface module;
a graphics processing unit; and
a graphics card interface module.

6. The extended computing unit of claim 1 further comprises, when the connection module is coupled to the handheld computing unit:
the hardware is operable, in combination with hardware of the handheld computing unit, to execute at least one of:
at least a portion of a computer-level user application of the one or more computer-level user applications;
at least a portion of a computer-level system application; and
at least a portion of the operating system extension.

7. The extended computing unit of claim 1, wherein the one or more exclusive extended computing unit user applications includes one or more of:

a voice over internet application;
an internet radio application;
an internet television application;
an internet video playback application; and
an entertainment device control application.

8. An integrated circuit (IC) comprises:
memory operable to temporarily store at least a portion of at least one of:
one or more computer-level user applications executable by a handheld computing unit or the handheld computing unit in combination with the extended computing unit;
one or more exclusive extended computing unit user applications executable by the extended computing unit apart from the handheld computing unit;
an exclusive extended computing unit operating system executable by the extended computing unit apart from the handheld computing unit; and
an operating system extension of a computer-level operating system, the operating system extension operable to augment a primary operating system executed by the handheld computing unit when the connection module is coupled to the handheld computing unit; and hardware operable, when the IC is in a non-coupled mode with respect to the handheld computing unit, to:
execute the extended computing unit exclusive operating system;
detect a request for activation of an extended computing unit exclusive user application of the one or more extended computing unit exclusive user applications; and
execute a least a portion of the extended computing unit exclusive user application.

9. The IC of claim 8, wherein the memory comprises:
first memory for temporarily storing at least a portion of at least one of:
the one or more exclusive extended computing unit user applications; and
the exclusive extended computing unit operating system; and
second memory for temporarily storing at least a portion of at least one of:
the one or more computer-level user applications; and
the operating system extension of a computer-level operating system.

10. The IC of claim 8, wherein the hardware comprises:
first hardware for executing the extended computing unit exclusive operating system, detecting the request for activation of the extended computing unit exclusive user application, and executing the least a portion of the extended computing unit exclusive user application; and
second hardware operable when the IC is in a coupled mode with respect to the handheld computing unit, wherein the second hardware executes, in combination with hardware of the handheld computing unit, at least one of:
at least a portion of a computer-level user application of the one or more computer-level user applications; and
at least a portion of the operating system extension.

11. The IC of claim 8 further comprises the memory operable to:
store one or more exclusive extended computing unit system applications.

12. The IC of claim 8, wherein the hardware comprises at least one of:
a processing module;

a memory controller;
an input/output controller;
an input/output interface module;
a peripheral component interface module;
a graphics processing unit; and
a graphics card interface module.

13. The extended computing unit of claim 8 further comprises, when the IC is in a coupled mode with respect to the handheld computing unit:
   the hardware is operable, in combination with hardware of the handheld computing unit, to execute at least one of:
      at least a portion of a computer-level user application of the one or more computer-level user applications;
      at least a portion of a computer-level system application; and
      at least a portion of the operating system extension.

14. An extended computing unit comprises:
   a connection module;
   memory operable to store:
      one or more computer-level user applications executable by a handheld computing unit or by the handheld computing unit in combination with the extended computing unit;
      an operating system extension of a computer-level operating system, the operating system extension operable to augment a primary operating system executed by the handheld computing unit when the connection module is coupled to the handheld computing unit;
      one or more exclusive extended computing unit user applications executable by the extended computing unit apart from the handheld computing unit; and
      an exclusive extended computing unit operating system executable by the extended computing unit apart from the handheld computing unit;
   hardware coupled to the connection module and to the memory, wherein, when the connection module is coupled to the handheld computing unit, the hardware is operable, in combination with hardware of the handheld computing unit, to execute at least one of:
      at least a portion of a computer-level user application of the one or more computer-level user applications; and
      at least a portion of the operating system extension; and
   wherein when the connection module is not coupled to a handheld computing unit, the hardware is operable to:
      execute the extended computing unit exclusive operating system;
      detect a request for activation of an extended computing unit exclusive user application of the one or more extended computing unit exclusive user applications; and
      execute a least a portion of the extended computing unit exclusive user application.

15. The extended computing unit of claim 14 further comprises:
   the memory storing a computer-level system application; and
   when the connection module is coupled to a handheld computing unit, the hardware is operable, in combination with hardware of the handheld computing unit, to execute at least a portion of a computer-level system application.

16. The extended computing unit of claim 14, wherein the memory comprises:
   first memory for storing the one or more exclusive extended computing unit user applications and the exclusive extended computing unit operating system; and
   second memory for storing the one or more computer-level user applications and the operating system extension of a computer-level operating system.

17. The extended computing unit of claim 14, wherein the hardware comprises:
   first hardware for executing the extended computing unit exclusive operating system, detecting the request for activation of the extended computing unit exclusive user application, and executing the least a portion of the extended computing unit exclusive user application; and
   second hardware operable when the connection module is connected to the handheld computing, wherein the second hardware executes, in combination with hardware of the handheld computing unit, at least one of:
      the at least a portion of a computer-level user application of the one or more computer-level user applications; and
      the at least a portion of the operating system extension.

18. The extended computing unit of claim 14, wherein the hardware comprises at least one of:
   a processing module;
   a memory controller;
   an input/output controller;
   an input/output interface module;
   a peripheral component interface module;
   a graphics processing unit; and
   a graphics card interface module.

* * * * *

UNITED STATES PATENT AND TRADEMARK OFFICE
CERTIFICATE OF CORRECTION

PATENT NO.         : 7,870,321 B2
APPLICATION NO.    : 12/326971
DATED              : January 11, 2011
INVENTOR(S)        : Ahmadreza Rofougaran It is certified that error appears in the above-identified patent and that said Letters Patent is hereby corrected as shown below:

Col. 27, line 33, in claim 3: after "executing the" insert --at--
Col. 28, line 33, in claim 8: replace "a least" with --at least--
Col. 28, line 51, in claim 10: after "executing the" insert --at--
Col. 30, line 30, in claim 17: after "executing the" insert --at--
Col. 30, line 33, in claim 17: after "handheld computing" insert --unit--

Signed and Sealed this
Fifth Day of March, 2013

Teresa Stanek Rea
*Acting Director of the United States Patent and Trademark Office*